(12) United States Patent
Morimoto et al.

(10) Patent No.: US 8,190,000 B2
(45) Date of Patent: May 29, 2012

(54) RECORDING APPARATUS, RECORDING METHOD, AND RECORDING PROGRAM

(75) Inventors: Naoki Morimoto, Tokyo (JP); Kenichiro Aridome, Kanagawa (JP); Yukio Isobe, Kanagawa (JP); Atsushi Mae, Kanagawa (JP)

(73) Assignee: Sony Corporation (JP)

( * ) Notice: Subject to any disclaimer, the term of this patent is extended or adjusted under 35 U.S.C. 154(b) by 1336 days.

(21) Appl. No.: 11/888,569

(22) Filed: Aug. 1, 2007

(65) Prior Publication Data
US 2008/0037955 A1 Feb. 14, 2008

(30) Foreign Application Priority Data
Aug. 10, 2006 (JP) ............... P2006-219001

(51) Int. Cl.
*H04N 5/92* (2006.01)
*H04N 5/78* (2006.01)
*H04N 9/80* (2006.01)
*H04N 9/88* (2006.01)
*G11B 5/09* (2006.01)
*G11B 7/00* (2006.01)

(52) U.S. Cl. ........ 386/337; 386/240; 386/241; 386/248; 386/263; 386/264; 386/314; 386/326; 369/47.11; 369/47.31; 369/53.37

(58) Field of Classification Search ............. 386/337, 386/240, 241, 248, 263, 264, 314, 326, E5.001, 386/E5.064, E5.069, E5.072, E9.013; 369/47.11, 369/47.31, 53.37
See application file for complete search history.

(56) References Cited

U.S. PATENT DOCUMENTS
7,161,878 B2 * 1/2007 Yoshioka ............... 369/47.11
(Continued)

FOREIGN PATENT DOCUMENTS
EP 1089571 4/2001
(Continued)

OTHER PUBLICATIONS

Blu-Ray Disc Founders: "White paper Blu-Ray Disc Format : 2.8 Audio Visual Application format specifications for BD-ROM" [Online] Aug. 2004 XP002315435 Retrieved from the Internet:URL : http://www.Blu-raydisc.com/assets/downloadablefile/2b_bdrom_audiovisual application-12841 pdf> [retrieved on Jan. 23, 2005] pp. 15,16.

*Primary Examiner* — Thai Tran
*Assistant Examiner* — Syed Hasan
(74) *Attorney, Agent, or Firm* — Lerner, David, Littenberg, Krumholz & Mentlik, LLP

(57) ABSTRACT

A recording apparatus capable of multiplexing video data and audio data and recording the video data and audio data in multiple record units as one file on a recording medium includes a data receiving unit, a recording instruction receiving unit, a packet generating unit, a recording unit, and a control unit. The control unit controls the packet generating unit and the recording unit so as to record data embedded with padding data in a section from the trailing end of valid data to the trailing end of the block including the trailing end of the valid data at stop of the recording and to record data embedded with the padding data in a section from the trailing end of the block to the trailing end of the packet including the trailing end of the block at restart of the recording after the recording is stopped.

22 Claims, 18 Drawing Sheets

U.S. PATENT DOCUMENTS

| | | | |
|---|---|---|---|
| 7,283,728 B2 * | 10/2007 | Gotoh et al. | 386/264 |
| 2002/0186961 A1 * | 12/2002 | Kikuchi et al. | 386/98 |
| 2003/0210623 A1 * | 11/2003 | Fukuchi | 369/47.31 |
| 2004/0240863 A1 * | 12/2004 | Nishizawa | 386/125 |
| 2005/0175321 A1 | 8/2005 | Aridome et al. | |
| 2006/0007814 A1 | 1/2006 | Kiyama et al. | |

FOREIGN PATENT DOCUMENTS

| | | |
|---|---|---|
| EP | 1248452 | 10/2002 |
| JP | 10-320928 A | 12/1998 |
| JP | 2002-230889 A | 8/2002 |
| JP | 2004-047116 A | 2/2004 |
| JP | 2004-350251 A | 12/2004 |

* cited by examiner

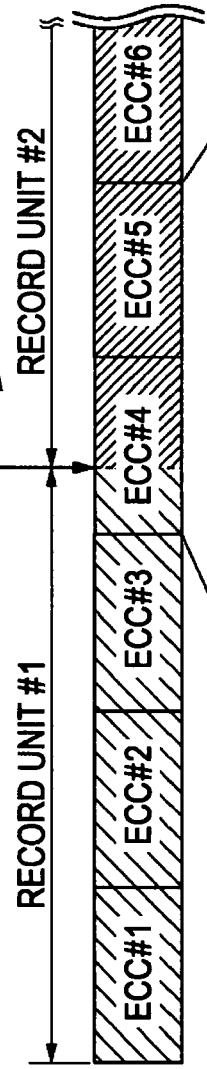
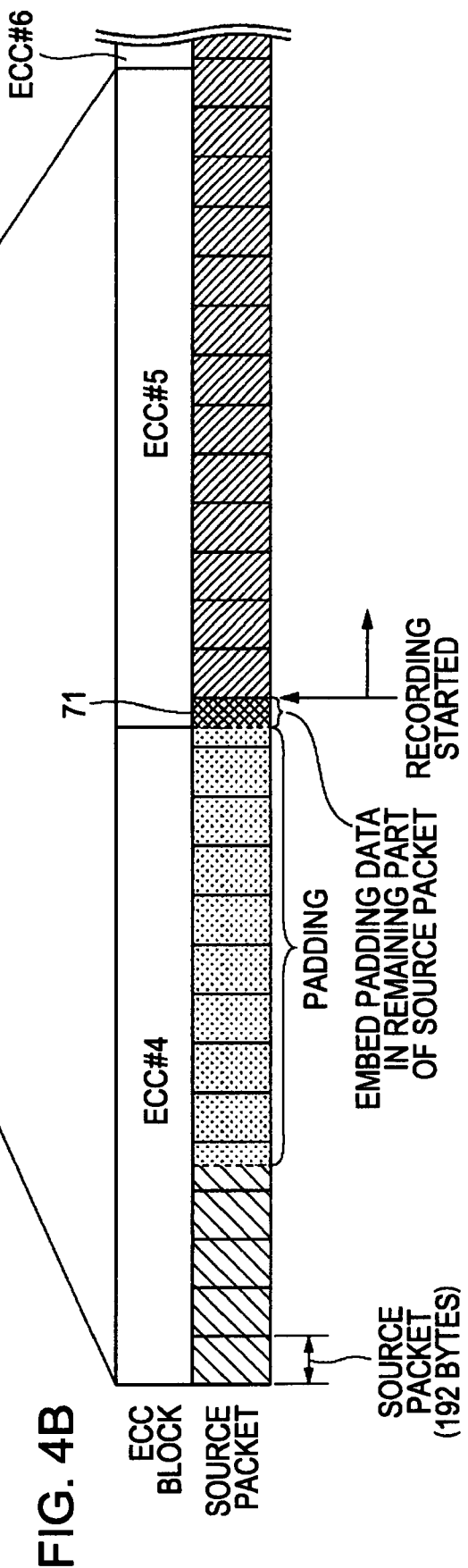
FIG. 4A
FIG. 4B

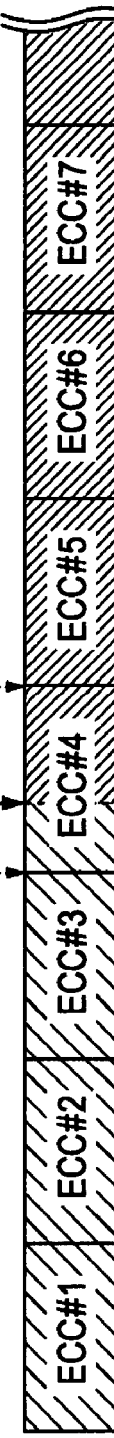
FIG. 16A  FIG. 16B  FIG. 16C

RECORDING APPARATUS, RECORDING METHOD, AND RECORDING PROGRAM

CROSS-REFERENCE TO RELATED APPLICATIONS

The present application claims priority from Japanese Patent Application No. JP 2006-219001, filed in the Japanese Patent Office on Aug. 10, 2006, the entire content of which is incorporated herein by reference.

BACKGROUND OF THE INVENTION

1. Field of the Invention

The present invention relates to a recording apparatus, a recording method, and a recording program, which are capable of efficiently recording stream data resulting from multiplexing of video data and audio data on a recording medium.

2. Description of the Related Art

Hitherto, digital versatile disks (DVDs) each having a recording capacity of 4.7 GB or more are in widespread use as recording media on which data can be recorded, which are removable from recording-playback apparatuses, which have relatively high recording capacities, and which are suitable for recording of audio-video data (AV data) consisting of audio data and video data. Japanese Unexamined Patent Application Publication No. 2004-350251 discloses an image pickup apparatus that records data on a digital versatile disk recordable (DVD-R) in a DVD-Video format.

Such DVD-Rs have file systems in Universal Disk Format (UDF) and can be accessed by computer apparatuses supporting the UDF. The UDF includes a format according to International Organization for Standardization (ISO) 9660, and various file systems used in the computer apparatuses adopt the UDF. Recording video data, for example, captured by image pickup apparatuses and audio data yielded by the image pickup as files on such DVD-Rs increases the affinity between the image pickup apparatuses and other apparatuses including computer apparatuses. As a result, the recorded data can be efficiently used.

FIG. 14 is a block diagram schematically showing a process of recording video data and audio data on a recording medium in related art. Referring to FIG. 14, a signal processing unit 100 receives video data and audio data. A video encoder 110 in the signal processing unit 100 compresses and encodes the video data and supplies the video data to a multiplexed stream generator 111. An audio encoder 112 in the signal processing unit 100 compresses and encodes the audio data and supplies the audio data to the multiplexed stream generator 111. The multiplexed stream generator 111 multiplexes the supplied video data and audio data and outputs one data stream. This data stream is supplied to a disk drive 101. An error correction coder 113 in the disk drive 101 performs error correction coding to the data stream and a recording processor 114 in the disk drive 101 performs recording encoding, modulation, and so on to the data stream to generate a recording signal. The recording signal is recorded on a disk 102, such as a DVD-R.

A minimum physical management unit on the DVD-R is a sector and the data size of one sector is equal to 2 KB. Specifically, the data size of one sector is equal to 2,048 bytes. In other words, the data is recorded on the disk 102 in a minimum unit of 2,048 bytes.

A control unit (not shown) applies a predetermined file system to the data stream recorded on the disk 102. For example, the file system writes address information concerning the data stream in a management area on the disk 102 to indicate how the file system accesses the data stream recorded on the disk 102.

The multiplexing in the multiplexed stream generator 111 will now be briefly described. Methods of multiplexing video data and audio data include application of transport streams defined in Moving Pictures Experts Group (MPEG) systems. In the transport streams in the MPEG systems, data is divided into packets that are subjected to time division multiplexing to provide one data stream in which video data and audio data is multiplexed.

Specifically, video data and audio data are respectively divided into predetermined sizes and headers storing information concerning, for example, decoding times and output times are added to the divided video data and audio data to form packetized elementary stream (PES) packets. Each PES packet is divided into predetermined sizes and headers storing information indicating data types are added to the divided PES packet to form transport stream (TS) packets each having a data size of 188 bytes. Multiple TS packets form one data stream.

A header of a predetermined size may be added to the TS packet and the TS packet to which the header is added may be recorded as a stream having unique specifications. For example, a header of four bytes is added to the TS packet to form a packet having a data size of 192 bytes.

In this case, 32 packets each having a data size of 192 bytes have a total data size of 6,144 bytes (6 KB). The 32 packets have a data size that is an integral multiple of the data size, which is 2,048 bytes (2 kB), of one sector on a DVD-R. Accordingly, the data can be efficiently recorded on the disk 102 in units of 32 packets each having a data size of 192 bytes. The unit of 6 KB, which corresponds to 32 packets each having a data size of 192 bytes, is hereinafter referred to as a signal-processing side data unit for convenience.

The error correction coding in the error correction coder 113 will now be briefly described. In recording of data on a recording medium, an error correction code is added to the data to perform the error correction coding. An encoding process using product codes is generally used for the error correction coding. For example, an outer code parity is generated for pieces of data, which are arranged in a matrix form in units of one symbol (for example, one byte) on a memory, in the column direction of the data on the basis of, for example, Reed Solomon product codes. Then, an inner code parity is generated for the data and the generated outer code parity in the row direction thereof to perform the error correction coding using the product codes. A data block generated by the error correction coding using the product codes is called an error correction coding (ECC) block.

It is efficient to determine the size of the ECC block in accordance with the minimum physical management unit on the recording medium and to record data on the recording medium in units of the ECC blocks. FIG. 15 shows an example of the relationship between sectors each being the minimum physical management unit on a DVD-R and ECC blocks. In the example in FIG. 15, one ECC block corresponds to 16 sectors and has a data size of 32 KB. In other words, the ECC block serves as a substantial access unit on a recording medium. The unit based on the data size of the ECC block is hereinafter referred to as a recording side data unit for convenience.

SUMMARY OF THE INVENTION

It is assumed that each record unit begins when recording is started and ends when the recording is stopped and that data in multiple record units is recorded in one stream file. For example, a data stream consisting of video data and audio data generated by a recording start operation and a recording stop operation on a recording apparatus is recorded in a file and, when the next recording start operation is performed for the recording apparatus, the data stream consisting of the video data and the audio data generated during the next recording is added to the same file.

As described above, in the signal processing unit 100, data is multiplexed in units of packets each having a data size of 192 bytes and data is generated in signal-processing side data units each having a data size of 6 KB. In contrast, in the disk drive 101, the error correction coder 113 processes data in recording side data units each having a data size of 32 KB. Since the data size of the recording side data unit is not an integral multiple of the data size of the signal-processing side data unit, the data generated only on the basis of the signal-processing side data unit does not necessarily match with the recording side data unit.

In order to add the data in the next data unit to the same file in a state in which the data ends at an intermediate point of the recording side data unit, or the ECC block unit, it is necessary to adopt any of the following methods having problems.

A first method restarts writing of data on the basis of restrictions of the signal-processing side data unit. The first method restarts writing of data in the next record unit from an intermediate point of the ECC block including the trailing end of the data in the record unit where the recording has been stopped (referred to as a previous record unit).

The first method will now be schematically described with reference to FIGS. 16A to 16C. As shown in FIG. 16A, it is assumed that the recording is started from an ECC block #1 and the recording is stopped at an intermediate point in an ECC block #4. The section from the beginning of the ECC block #1 to the position where the recording is stopped (recording stop position) is referred to as a record unit #1. The ECC block #4 including the data at the recording stop position is subjected to the error correction coding and the data after the recording stop position in the ECC block #4 is also subjected to the error correction coding. When the next recording is started, the writing of the data is restarted from the recording stop position to create a state shown in FIG. 16C.

When the writing of the data is to be restarted from the previous recording stop position at the start of the next recording, as shown in FIG. 16B, the data in the ECC block #4 including the previous recording stop position is read out from the disk 102, the error correction code in the data is decoded, and the decoded data is written in, for example, a memory. The writing of the data generated by the recording start operation is restarted from the previous recording stop position in the data written in the memory. After a predetermined amount of data is written in the memory, the error correction coding is performed to the data in the memory to recreate the ECC block #4. The ECC block #4 is recorded on the disk 102 and the ECC blocks #5, #6, . . . are continuously recorded on the disk 102 to create the state in FIG. 16C.

According to the first method, in order to restart writing of the data from an intermediate point of an ECC block on a recording medium on which data can be rewritten, it is necessary to read again the data in the ECC block including the data at the trailing end of the previous record unit from the recording medium and to perform the error correction coding again to the readout data and to the data generated by the next recording start operation. Accordingly, there is a problem in that it takes a long time to process the data.

There is also a problem in that the first method cannot be applied to a recording medium on which data that has been recorded once cannot be physically deleted or rewritten (write-once recording medium).

A second method restarts writing of data on the basis of restrictions of the recording side data unit. The second method skips the ECC block including the data at the trailing end of the previous record unit and restarts the writing of the data in the next record unit from the beginning of the next ECC block. The second method will now be schematically described with reference to FIGS. 17A and 17B.

As in the example in FIG. 16A, it is assumed that the recording is started from an ECC block #1 and the recording is stopped at an intermediate point in an ECC block #4 (refer to FIG. 17A). As shown in FIG. 17B, the second method restarts the writing of the data generated by the next recording start operation from the beginning of an ECC block #5 next to the ECC block #4 including the data at the recording stop position. In other words, in the second method, an area from the recording stop position in the ECC block #4 to the next recording start position, that is, to the beginning of the ECC block #5 becomes a blank area in which valid video data does not exist.

Some file systems have a problem in that it is not possible to represent the existence of a blank area in the recording side data unit in one file. Such a file system is exemplified by File Allocation Table 16 (FAT16), used in Windows (registered trademark) which is one of operation systems (OSs) adopted in computer apparatuses.

In contrast, in the UDF described above, management information used for managing a blank area in one file is defined. Accordingly, use of the management information for the blank area allows the existence of a skipped area in an ECC block to be represented. However, if repeating the start of recording and the stop of recording in one file produces many blank areas, the amount of the management information for the blank areas increases with the increasing number of blank areas. In such a case, it is necessary to ensure a new area for the management information for the blank areas on the disk 102 with an increase in the size of the management data in the file system. As a result, there is a problem in that the amount of processing is increased in both the recording operation and the playback operation.

In addition to the first and second methods described above, there is a third method in which the recording is performed such that restrictions of the recording side data unit and restrictions of the signal-processing side data unit are met. For example, the recording is performed in management units based on the data size corresponding to the least common multiple of the data size of the signal-processing side data unit and that of the recording side data unit.

The third method will now be schematically described with reference to FIGS. 18A to 18C. As in the examples shown in FIGS. 16A and 17A, it is assumed that the recording is started from an ECC block #1 and the recording is stopped at an intermediate point in an ECC block #4 (refer to FIG. 18A). The third method aligns the recording start position with the beginning of the management unit at the start of the recording. The beginning of the management unit is a position where the end of the recording side data unit agrees with the end of the signal-processing side data unit. For example, when the recording is restarted after the recording was stopped, the section from the recording stop position to the beginning of the next management unit is embedded with padding data consisting of a predetermined bit string or the like (refer to FIG. 18B). At the start of the next recording, the writing of the data is started from the beginning of the next management unit (refer to FIG. 18C).

According to the third method, since the data size of the management unit in the recording is larger than both the data size of the recording side data unit and that of the signal-processing side data unit, there is a problem in that the recording space is wasted in order to align the next recording start position with the beginning of the management unit.

For example, when the data size of the signal-processing side data unit is equal to 6 KB and the data size of the recording side data unit is equal to 32 KB, the recording is performed by using a data size of 96 KB, which is the least common multiple of both of the data sizes, as the management unit. Accordingly, there is a problem in that a recording space of up to about 96 KB can be wasted for every management unit.

In addition, if a larger amount of padding data is embedded in a posterior part of the previous record unit of the video data when the video data in a certain record unit (the previous record unit) and the video data in the next record unit are to be seamlessly played back, that is, when the video data in the previous record unit and the video data in the next record unit are to be continuously played back in accordance with the framing timing, more restrictions are imposed on the amount of bit of the video data in an anterior part of the next record unit. As a result, the image quality can be undesirably degraded.

For example, a predetermined upper limit is set for the data bandwidth of a stream input in a video recorder for decoding video data in a playback apparatus. Accordingly, the inclusion of a larger amount of padding data, which is not the video data, in the stream can relatively narrow the bandwidth of the video data to degrade the image quality.

It is desirable to provide a recording apparatus, a recording method, and a recording program, which are capable of efficiently recording data in multiple record units in one stream file. Each record unit begins when recording is started and ends when the recording is stopped.

According to a first embodiment of the present invention, a recording apparatus capable of multiplexing video data and audio data and recording the video data and audio data in multiple record units as one file on a recording medium, each record unit beginning when recording is started and ending when the recording is stopped, includes a data receiving unit that receives the video data and the audio data; a recording instruction receiving unit that receives instructions for starting and stopping the recording of the video data and the audio data; a packet generating unit that generates packets each having a first size and stores the video data and the audio data in the packets; a recording unit that records data output from the packet generating unit on the recording medium in units of blocks each having a second size larger than the first size; and a control unit that controls the packet generating unit and the recording unit and manages the data recorded on the recording medium as the file. The control unit controls the packet generating unit and the recording unit so as to record data embedded with padding data in a section from the trailing end of valid data to the trailing end of the block including the trailing end of the valid data at stop of the recording and to record data embedded with the padding data in a section from the trailing end of the block including the trailing end of the valid data to the trailing end of the packet including the trailing end of the block at restart of the recording after the recording is stopped.

According to a second embodiment of the present invention, a recording method capable of multiplexing video data and audio data and recording the video data and audio data in multiple record units as one file on a recording medium, each record unit beginning when recording is started and ending when the recording is stopped, includes the steps of receiving instructions for starting and stopping the recording of the video data and the audio data received with an input unit; generating packets each having a first size and storing the video data and the audio data in the packets; recording data output in the packet generating step on the recording medium in units of blocks each having a second size larger than the first size; and controlling the packet generating step and the recording step and managing the data recorded on the recording medium as the file. The control step controls the packet generating step and the recording step so as to record data embedded with padding data in a section from the trailing end of valid data to the trailing end of the block including the trailing end of the valid data at stop of the recording and to record data embedded with the padding data in a section from the trailing end of the block including the trailing end of the valid data to the trailing end of the packet including the trailing end of the block at restart of the recording after the recording is stopped.

According to a third embodiment of the present invention, a recording program causing a computer to perform a recording method capable of multiplexing video data and audio data and recording the video data and audio data in multiple record units as one file on a recording medium, each record unit beginning when recording is started and ending when the recording is stopped, includes the steps of receiving instructions for starting and stopping the recording of the video data and the audio data received with an input unit; generating packets each having a first size and storing the video data and the audio data in the packets; recording data output in the packet generating step on the recording medium in units of blocks each having a second size larger than the first size; and controlling the packet generating step and the recording step and managing the data recorded on the recording medium as the file. The control step controls the packet generating step and the recording step so as to record data embedded with padding data in a section from the trailing end of valid data to the trailing end of the block including the trailing end of the valid data at stop of the recording and to record data embedded with the padding data in a section from the trailing end of the block including the trailing end of the valid data to the trailing end of the packet including the trailing end of the block at restart of the recording after the recording is stopped.

According to a fourth embodiment of the present invention, an image pickup apparatus capable of multiplexing video data and audio data and recording the video data and audio data in multiple record units as one file on a recording medium, each record unit beginning when recording is started and ending when the recording is stopped, includes an imaging unit that captures an image of a subject to output the video data; a sound pickup unit that picks up a sound to output the audio data; a packet generating unit that generates packets each having a first size and stores the video data and the audio data in the packets; a recording unit that records data output from the packet generating unit on the recording medium in units of blocks each having a second size larger than the first size; an operation unit that receives user operations for instructing start and stop of the recording of the video data and the audio data on the recording medium; and a control unit that controls the packet generating unit and the recording unit and manages the data recorded on the recording medium as the file. The control unit controls the packet generating unit and the recording unit so as to record data embedded with padding data in a section from the trailing end of valid data to the trailing end of the block including the trailing end of the valid data at stop of the recording and to record data embedded with the padding data in a section from the trailing end of the block including the trailing end of the valid data to the trailing end of the packet including the trailing end of the block at restart of the recording after the recording is stopped.

According to a fifth embodiment of the present invention, an image pickup method for an image pickup apparatus capable of multiplexing video data and audio data and recording the video data and audio data in multiple record units as one file on a recording medium, an imaging unit capturing an image of a subject to output the video data, a sound pickup unit picking up a sound to output the audio data, each record unit beginning when recording is started and ending when the recording is stopped, includes the steps of generating packets each having a first size and storing the video data and the audio data in the packets; recording data output in the packet generating step on the recording medium in units of blocks each having a second size larger than the first size; receiving user operations for instructing start and stop of the recording of the video data and the audio data on the recording medium; and controlling the packet generating step and the recording step and managing the data recorded on the recording medium as the file. The control step controls the packet generating step and the recording step so as to record data embedded with padding data in a section from the trailing end of valid data to the trailing end of the block including the trailing end of the valid data at stop of the recording and to record data embedded with the padding data in a section from the trailing end of the block including the trailing end of the valid data to the trailing end of the packet including the trailing end of the block at restart of the recording after the recording is stopped.

According to a sixth embodiment of the present invention, an image pickup program causing a computer to perform an image pickup method for an image pickup apparatus capable of multiplexing video data and audio data and recording the video data and audio data in multiple record units as one file on a recording medium, an imaging unit capturing an image of a subject to output the video data, a sound pickup unit picking up a sound to output the audio data, each record unit beginning when recording is started and ending when the recording is stopped, includes the steps of generating packets each having a first size and storing the video data and the audio data in the packets; recording data output in the packet generating step on the recording medium in units of blocks each having a second size larger than the first size; receiving user operations for instructing start and stop of the recording of the video data and the audio data on the recording medium; and controlling the packet generating step and the recording step and managing the data recorded on the recording medium as the file. The control step controls the packet generating step and the recording step so as to record data embedded with padding data in a section from the trailing end of valid data to the trailing end of the block including the trailing end of the valid data at stop of the recording and to record data embedded with the padding data in a section from the trailing end of the block including the trailing end of the valid data to the trailing end of the packet including the trailing end of the block at restart of the recording after the recording is stopped.

As described above, according to the first to third embodiments of the present invention, the video data and the audio data are stored in the generated packets each having the first size, the packets are recorded on the recording medium in units of blocks each having the second size larger than the first size, and the data recorded on the recording medium is managed as a file. At stop of the recording, the data embedded with the padding data in the section from the trailing end of valid data to the trailing end of the block including the trailing end of the valid data is recorded. At restart of the recording after the recording is stopped, the data embedded with the padding data in the section from the trailing end of the block including the trailing end of the valid data to the trailing end of the packet including the trailing end of the block is recorded. Accordingly, the first to third embodiments of the present invention have the advantages in that even repetition of the start of the recording and stop thereof does not produce a blank area in the file and in that the amount of the padding data does not exceed the amount of data in the block.

According to the fourth to sixth embodiments of the present invention, the video data yielded by capturing an image of a subject and the audio data yielded by collecting a sound are stored in the generated packets each having the first size, the packets are recorded on the recording medium in units of blocks each having the second size larger than the first size, and the data recorded on the recording medium is managed as a file. User operations instructing the start and stop of the recording of the video data and the audio data on the recording medium are received. At stop of the recording, the data embedded with the padding data in the section from the trailing end of valid data to the trailing end of the block including the trailing end of the valid data is recorded. At restart of the recording after the recording is stopped, the data embedded with the padding data in the section from the trailing end of the block including the trailing end of the valid data to the trailing end of the packet including the trailing end of the block is recorded. Accordingly, the fourth to sixth embodiments of the present invention have the advantages in that even repetition of the start of the recording and stop thereof does not produce a blank area in the file and in that the amount of the padding data does not exceed the amount of data in the block.

BRIEF DESCRIPTION OF THE DRAWINGS

FIGS. 4A and 4B illustrate a process in which normal recording is started after recording is stopped and writing of data in a file that has been temporarily closed at the stop of the recording is restarted;

FIGS. 16A to 16C illustrate how to restart writing of data on the basis of restrictions of a signal-processing side data unit;

DESCRIPTION OF THE PREFERRED EMBODIMENTS

Embodiments of the present invention will now be described with reference to the attached drawings.

Figure 1:
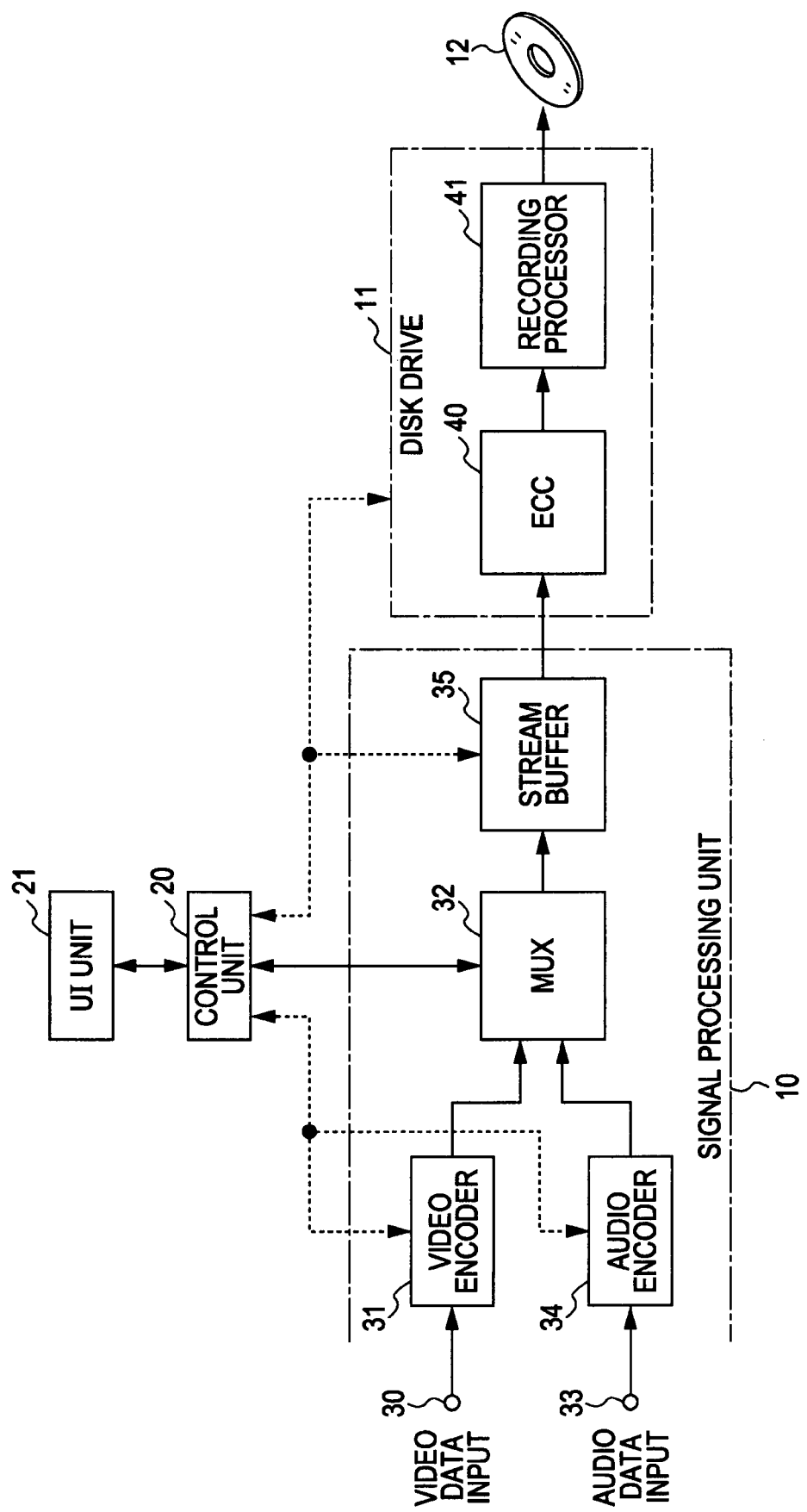
FIG. 1 is a block diagram showing an example of the configuration of a recording apparatus according to an embodiment of the present invention.

FIG. 1 is a block diagram showing an example of the configuration of a recording apparatus according to an embodiment of the present invention. The recording apparatus compresses and encodes video data and audio data that are input in a predetermined format, multiplexes the compressed and encoded video data and audio data to generate one data stream, and records the data stream in a recording medium as a file.

The recording apparatus shown in FIG. 1 may be used as a separate recording apparatus recording video data and audio data that are externally input on a recording medium. Alternatively, the recording apparatus shown in FIG. 1 may be used as a recording block in a video camera apparatus. The recording block is combined with a camera block provided with an optical system, an imaging device, and so on and records video data based on an imaging signal captured by the camera block on a recording medium. In the following description, each record unit begins when recording is started and ends when the recording is stopped.

Various compression and encoding methods and various multiplexing methods are applicable to the embodiment of the present invention. For example, a method defined in International Telecommunication Union-Telecommunication Standardization Sector (ITU-T) recommendation H.264 or International Organization for Standardization (ISO)/International Electrotechnical Commission (IEC) International Standardization 14496-10 (MPEG-4 part 10) Advanced Video Coding (hereinafter abbreviated as H.264/AVC) is applicable as the compression and encoding method according to the embodiment of the present invention. However, the compression and encoding method is not limited to the H.264/AVC and compression and encoding may be performed according to MPEG-2. For example, MPEG-2 Systems is applicable to the multiplexing method according to the embodiment of the present invention. It is assumed in the following description that video data is compressed and encoded by a method according to the H.264/AVC and that video data and audio data are multiplexed by a method according to MPEG-2 Systems.

The recording apparatus shown in FIG. 1 mainly includes a signal processing unit 10 and a disk drive 11. A control unit 20 controls the signal processing unit 10 and the disk drive 11 to operate the entire recording apparatus. The signal processing unit 10 encodes video data received through a terminal 30 and audio data received through a terminal 33, packetizes the encoded video data and audio data, and performs time division multiplexing to the video data and the audio data in units of packets to output one data stream. The disk drive 11 performs predetermined error correction coding to the data stream supplied from the signal processing unit 10 and further performs recording encoding, modulation, and so on to generate a recording signal that is recorded on a disk 12, which is a recording medium.

The disk 12 on which data is recorded is, for example, a DVD-R. However, the disk 12 is not limited to the DVD-R and may be a higher-capacity Blu-ray disc (Registered Trademark).

The control unit 20 includes, for example, a central processing unit (CPU), a random access memory (RAM), and a read only memory (ROM), which are not shown in FIG. 1. The control unit 20 uses the RAM as a working memory on the basis of programs and data stored in advance in the ROM to control the components in the signal processing unit 10 and the disk drive 11 in the recording apparatus.

A program running on the control unit 20 supplies a file system used in the recording apparatus. For example, the control unit 20 associates physical addresses on the disk 12 with files in which data to be recorded on the disk 12 is stored on the basis of the file system and generates logical management information concerning the files in which the data is stored. The file system is used to manage information concerning, for example, the sizes and the creation times of the files. Creation, opening, and closing of a new file is controlled by the control unit 20 on the basis of the file system. If the disk 12 is a DVD-R, the minimum record unit is a sector having a data size of 2 KB and the file system manages the data by using the sector size, 2 KB, as the minimum management unit.

A user interface (UI) unit 21 has a handler used by a user who operates the recording apparatus and outputs a control signal in response to an operation with the handler. The control signal is supplied to the control unit 20. The control unit 20 controls the operation of each component in the recording apparatus in accordance with the program executed on the basis of the control signal supplied from the UI unit 21 in response to the user operation. For example, the control unit 20 controls start and stop of the recording operation by the recording apparatus in response to a user operation with the UI unit 21.

An ejection operation of the disk 12 is performed by the control unit 20, which controls an ejection unit (not shown) of the disk 12, in response to an operation of an ejection button provided on the UI unit 21 or the recording apparatus.

Baseband digital video data is input through the terminal 30 and is supplied to a video encoder 31. The video encoder 31 compresses and encodes the supplied digital video data in a predetermined format. In the embodiment of the present invention in which the compression and encoding is performed by a method defined in the H.264/AVC, for example, intraframe compression is performed by Discrete Cosine Transform (DCT) and intra prediction, interframe compression using motion vectors is performed, and entropy coding is performed to improve the compression efficiency. The digital video data compressed and encoded by the video encoder 31 is supplied to a multiplexer (MUX) 32 as an elementary stream (ES) of the video data according to the H.264/AVC.

Baseband digital audio data is input through the terminal 33 and is supplied to an audio encoder 34. The audio encoder 34 compresses and encodes the supplied digital audio data in a predetermined format, for example, Audio Code number 3 (AC3). However, the compression and encoding method of the audio data is not limited to the AC3. The baseband audio data compressed in Pulse Code Modulation (PCM) may be used without compression and encoding of the audio data. The compressed and encoded digital audio data is supplied to the MUX 32 as an elementary stream (ES) of the audio data.

The MUX 32 multiplexes the supplied elementary streams of the video data and the audio data in a predetermined format and outputs the multiplexed video data and audio data as one data stream. In the embodiment of the present invention in which the multiplexing is performed according to the MPEG-2 Systems, an MPEG-2 transport stream is used to perform the time division multiplexing to the compressed video data and audio data, which are supplied. For example, the MUX 32 includes a buffer memory (not shown) and stores the supplied elementary streams of the video data and the audio data in the buffer memory.

In the H.264/AVC, the interframe compression using interframe correlation is used to encode the video data in decoding units based on positions where the decoding can be started. The decoding units are, for example, Groups of Pictures (GOP). Since it is necessary to align the video data to be stored in files with the borders between the decoding units, the MUX 32 creates TS packets in alignment with the borders between the decoding units.

The elementary stream of the video data stored in the buffer memory is divided into predetermined sizes and a header is added to each divided elementary stream to create a PES packet. The elementary stream of the audio data is also divided into predetermined sized and a header is added to each divided elementary stream to create a PES packet. The header has predetermined information, such as Presentation Time Stamp (PTS) indicating the playback time of data stored in the packet and Decoding Time Stamp (DTS) indicating the decoding time thereof, defined in the MPEG-2 Systems. The PES packet is further divided into predetermined sizes and a header is added to each divided PES packet to create a TS packet having a data size of 188 bytes. In other words, the PES packet is divided into predetermined sizes that are embedded in the payload of the TS packet and the header has Packet Identification (PID) used for identifying the data embedded in the payload.

The MUX 32 adds a header having a data size of four bytes to the TS packet and outputs the TS packet to which the header is added. The packet resulting from the addition of the header having a data size of four bytes to the TS packet is called a source packet. Each source packet has a source packet number allocated thereto. The source packet number is used to identify the source packet and indicates the order of the source packet. The source packet number can be stored in, for example, the header added to the TS packet.

The source packet output from the MUX 32 is temporarily stored in a stream buffer 35. The control unit 20 monitors the amount of the data stored in the stream buffer 35 and, if data of a predetermined amount or more is stored in the stream buffer 35, reads out the data from the stream buffer 35 on the basis of an error correction coding unit in an error correction coder 40.

The data read out from the stream buffer 35 is supplied to the error correction coder 40 in the disk drive 11. The error correction coder 40 performs error correction coding using product codes to the supplied data. For example, the data supplied to the error correction coder 40 is written in a memory (not shown) and is arranged in a matrix form in the memory. The error correction coder 40 generates an outer code parity for the data on the memory in the column direction of the data on the basis of Reed Solomon product codes and generates an inner code parity for the data and the outer code parity in the row direction thereof to perform the error correction coding using the product codes in order to create an ECC block. The ECC block has a data size of, for example, 32 KB.

The ECC block is read out from the memory of the error correction coder 40 and is supplied to a recording processor 41. The recording processor 41 performs predetermined recording encoding to the supplied data and modulates the data subjected to the recording encoding to generate a recording signal. The recording signal is recorded on the disk 12. The data is recorded on the disk 12 in units of the ECC blocks. In other words, the recording is performed in the disk drive 11 in units of the ECC blocks each having a data size of 32 KB.

The control unit 20 associates address information on the disk 12 and attribute information, such as file names, with the data recorded on the disk 12 on the basis of the file system and writes the data associated with the address information and the attribute information in a management area on the disk 12. Accordingly, the data recorded on the disk 12 can be accessed as files.

The control unit 20 generates the attribute information (referred to as stream information) concerning the data stream stored in the file recorded on the disk 12 on the basis of information acquired from, for example, the disk drive 11, the video encoder 31, the audio encoder 34, and the MUX 32. The stream information is generated on the RAM (not shown) by the control unit 20 and is recorded on the disk 12 as a stream information file at a predetermined timing.

The attribute information concerning the elementary stream of the video data includes a table indicating the correspondence between the PTSs and the source packet numbers, a frame size and an aspect ratio of the video data, attribute information concerning a codec, such as a frame rate, and information concerning a closed caption. The attribute information concerning the elementary stream of the audio data includes attribute information concerning a codec, such as an encoding method, information concerning a sampling frequency and a quantifying bit number, an output mode (5.1 channel or 2 channel stereo), and codes indicating the types of multiple languages that are used.

The stream information file is created, for example, in the record units and is recorded on the disk 12. One stream information file storing the stream information for every record unit may be created for a file storing multiple record units.

In the recording apparatus shown in FIG. 1, encoding settings in the video encoder 31 or the audio encoder 34 can be changed in response to an operation with the UI unit 21. For example, as for the video data, it is possible to change the settings of the frame size, the aspect ratio, the frame rate, and the scanning method. As for the audio data, it is possible to change the settings of the sampling frequency, the number of output channels, and the type of the codec. A control signal in response to the operation for changing the settings with the UI unit 21 is supplied from the UI unit 21 to the control unit 20. The control unit 20 controls the video encoder 31 or the audio encoder 34 on the basis of the control signal. For example, the control unit 20 may prepare in advance multiple recording modes differing in the settings of the compression ratio or the frame size of the video data and may collectively change the settings of multiple items in response to a switching operation of the recording modes with the UI unit 21.

Figure 2:
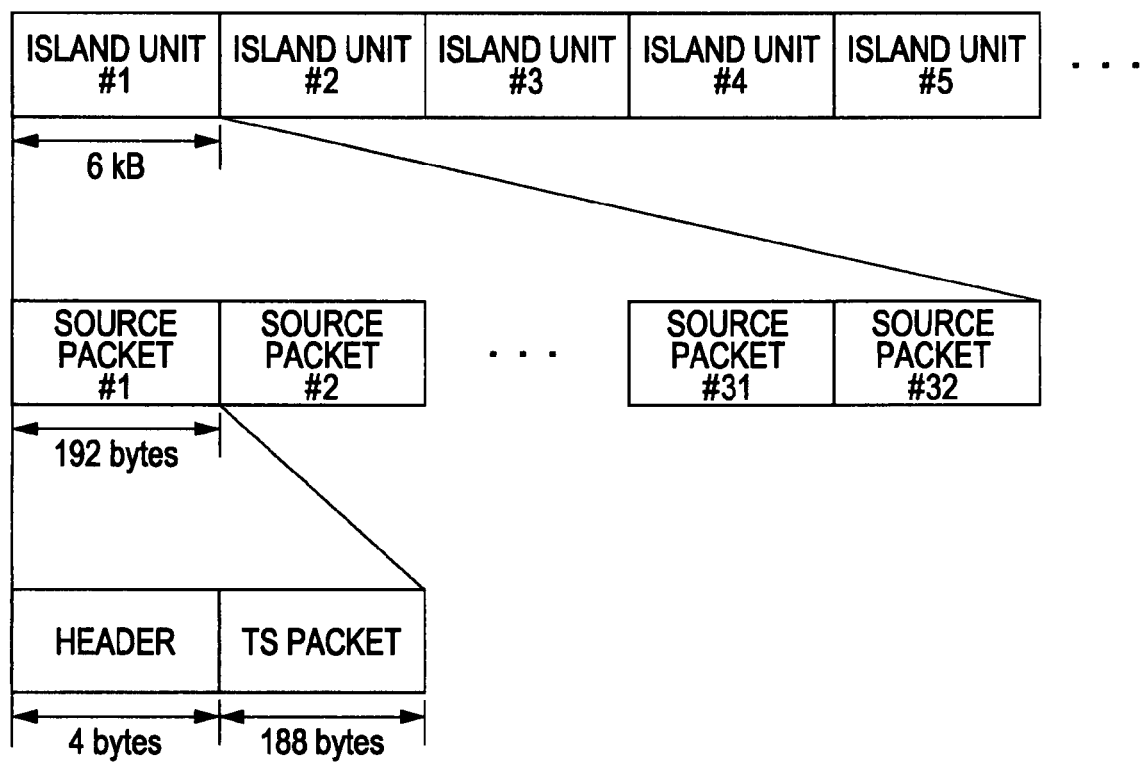
FIG. 2 shows an example of data structure applied to the embodiment of the present invention.

FIG. 2 shows an example of data structure applied to the embodiment of the present invention. A header having a data size of four bytes is added to a TS packet having a data size of 188 bytes to create a source packet having a data size of 192 bytes. A data unit that includes 32 source packets and that has a data size of 6 KB (6,144 bytes) is called an island unit. The island unit has a data size that is an integral multiple of the minimum management unit, 2 KB, of the data in the UDF file system.

A method of aligning data to be recorded on the disk 12, according to the embodiment of the present invention, will now be described. According to the embodiment of the present invention, the alignment method differs between when recording is stopped, when the disk 12 is ejected, and when file division is performed on the basis of system requirements. When recording is stopped, the data is aligned on the basis of the record units (for example, in units of the ECC blocks) of the disk drive 11. When the disk 12 is ejected and when the file division is performed on the basis of system requirements, the data is aligned on the basis of the management units of the file system.

Figures 3A, 3B:
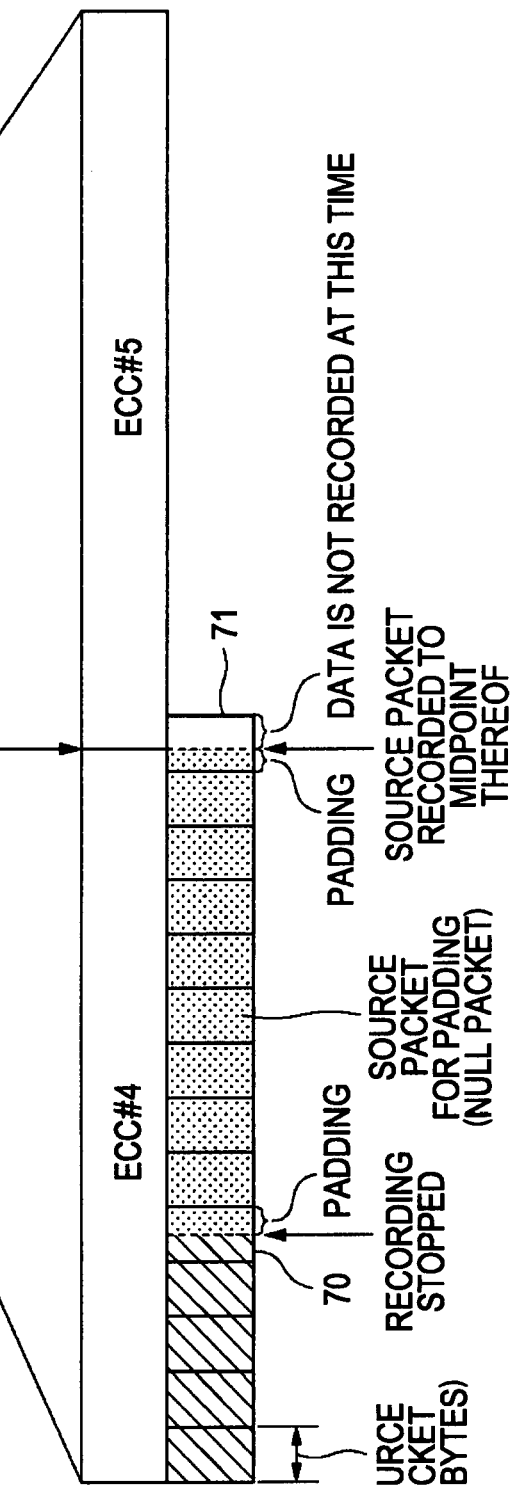
FIGS. 3A and 3B illustrate an alignment process used when recording is stopped.

FIGS. 3A and 3B illustrate the alignment process used when recording is stopped. The ECC blocks are represented by horizontally lining up the data arranged in a matrix form in the ECC blocks in FIGS. 3A and 3B. Referring to FIG. 3B, the ratio of the source packet with respect to the ECC block is increased for convenience. Such a representation method is common to similar figures described below.

When recording is stopped, the alignment of the data is performed at the border between the record units, or the ECC blocks. For example, as shown in FIG. 3A, it is assumed that recording is started from an ECC block #1 and the recording is stopped at an intermediate point in an ECC block #4. In this case, the section from the recording stop position in the ECC block #4 to the trailing end of the ECC block #4 is embedded with padding data. After the above section is embedded with the padding data, the file is temporarily closed.

FIG. 3B shows the ECC block #4 and an ECC block #5 in detail. First, the source packets including the data from the beginning of the ECC block #4 to the recording stop position are recorded on the disk 12. As shown by a source packet 70 in FIG. 3B, when the data from the beginning of the ECC block #4 to the recording stop position has been stored in the source packets, the data is possibly stored only in a section from the beginning of the source packet 70 to an intermediate point thereof. In this case, the section from the beginning of the source packet 70 to the recording stop position has valid data and the section from the recording stop position to the trailing end of the source packet 70 has invalid data, for example, the state of which is unstable. In the source packet 70 including the data at the recording stop position, the section from the recording stop position, or the trailing end of the valid data to the trailing end of the source packet 70 is embedded with predetermined padding data. Then, source packets for padding are recorded in the section from the source packet next to the source packet 70 including the data at the recording stop position to the border between the ECC block #4 and the ECC block #5.

For example, the payloads of the TS packets included in the source packets for padding are embedded with data having a value of zero ("0"). Such a source packet whose payload is embedded with the value "0" is called a null packet.

As shown by a source packet 71 in FIG. 3B, the trailing end of the ECC block #4 including the data at the recording stop position can be at an intermediate position of the source packet. In this case, the data having a value "0" is embedded only in the section from the beginning of the source packet 71 to the trailing end of the ECC block #4 in the source packet 71. At this time, nothing is recorded in the section subsequent to the trailing end of the ECC block #4 in the source packet 71.

A process in which the normal recording is started after the recording is stopped and writing of data in the file that has been temporarily closed at the stop of the recording is restarted will now be described with reference to FIGS. 4A and 4B. The start of the normal recording is an operation performed in response to a user operation, such as a recording start operation, with the UI unit 21. FIG. 4A corresponds to FIG. 3A described above and shows that the writing of data is restarted from the recording stop position in the ECC block #4.

When recording is restarted, the file where the recording has been temporarily stopped is opened. In the opened file, as shown in FIG. 4B, the section from the previous recording stop position in the source packet 71 to the trailing end of the source packet 71 is embedded with the padding data to complete the source packet 71. Source packets that are created by the start of the recording are sequentially recorded after the source packet 71.

Whether the previous recording stop position is at an intermediate position of the source packet and the position of the previous recording stop position in the source packet can be determined by dividing the file size by the data size of the source packet.

Specifically, if the residue of division of a byte value representing the file size by 192 bytes, which represents the data size of the source packet, is equal to "0", the previous recording stop position agrees with the trailing end of the source packet. If the residue of the division of a byte value representing the file size by the data size of the source packet is not equal to "0", the value of the residue indicates the byte position of the previous recording stop position in the source packet.

As described above, with the above method, the position of the previous recording stop position in the source packet can be determined on the basis of the file size. Only determining the file size of a target file on the basis of the file system, without storing information concerning the recording stop position in any manner, for example, in a non-volatile memory (not shown) or the disk 12, allows the byte position of the previous recording stop position in the source packet to be easily yielded. The writing of data is restarted from the yielded byte position.

For example, if the recording apparatus is turned off with the disk 12 being mounted in the recording apparatus and is turned on again, information on the working memory in the control unit 20 is lost and information concerning the process of the recording stored in the working memory is also lost. Even in such a case, the control unit 20 can identify the file that has been recently recorded on the disk 12 on the basis of the file system and can determine the size of the recent file to restart writing of the data in the next record unit in the file.

Figure 5A:
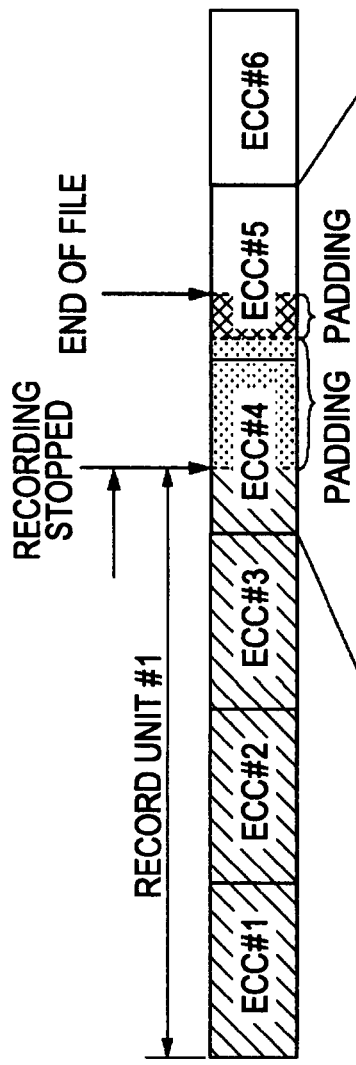
FIGS. 5A and 5B illustrate an alignment process used when a disk is ejected and when file division is performed on the basis of system requirements.
Figure 5B:
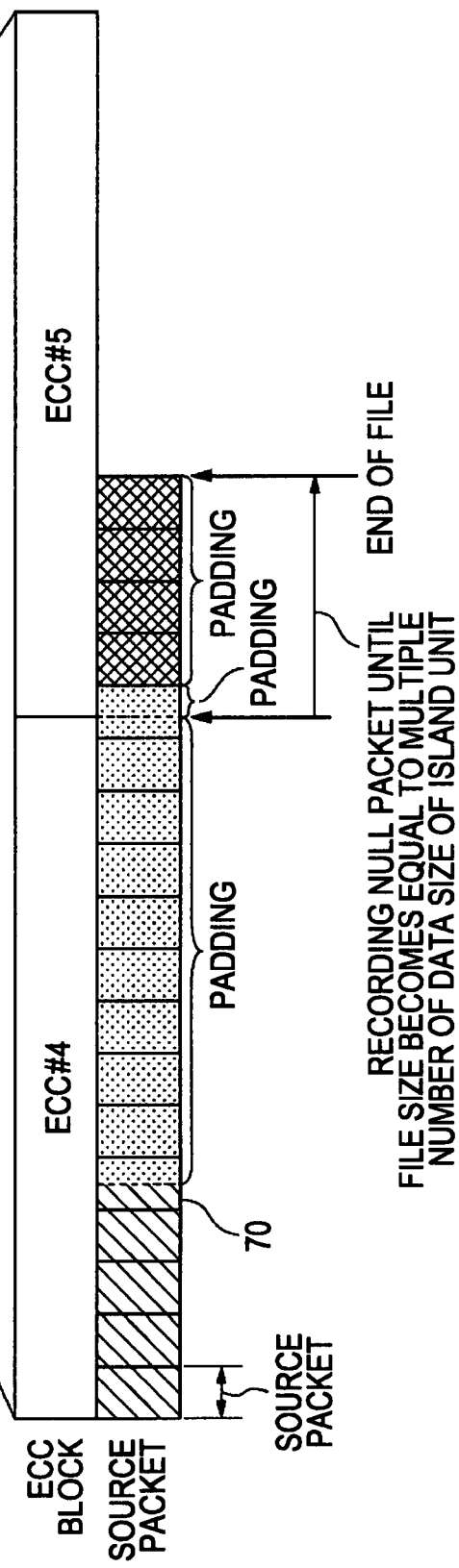

FIGS. 5A and 5B illustrate the alignment process used when the disk 12 is ejected and when the file division is performed on the basis of system requirements (described below in detail).

The ejection operation for ejecting the disk 12 from the recording apparatus is controlled by the control unit 20 in response to an operation of the ejection button provided on the case of the recording apparatus, as described above. The files recorded on the ejected disk 12 need to be accessed by the file system of another apparatus when the disk 12 is loaded in the other apparatus. When the file division is performed on the basis of the system requirements, no data is added to the anterior files among the divided files and the data stream needs to be completed in the anterior files.

Accordingly, when the disk 12 is ejected and when the file division is performed on the basis of system requirements, the alignment is performed on the basis of the island units and the file is closed in a state in which the data stream is completed so as to be accessed by the file system.

As in the examples shown in FIG. 3A and FIG. 4A, it is assumed in FIG. 5A that recording is started from an ECC block #1 and the recording is stopped at an intermediate point in an ECC block #4. First, the section from the recording stop position in the ECC block #4 to the trailing end of the ECC block #4 is embedded with the padding data, as described above with reference to FIGS. 3A and 3B. Then, the section from the trailing end of the ECC block #4 to a position where the data length of the file becomes equal to a multiple of the data size of the island unit is also embedded with the padding data, and the file is closed. When the file division is performed, a new file is created and the recording on the new file is continuously performed.

FIG. 5B shows the ECC block #4 and an ECC block #5 shown in FIG. 5A in detail. With the recording stop operation described above with reference to FIGS. 3A and 3B, the section from the recording stop position in the source packet 70 to the trailing end of the source packet 70 is embedded with the padding data and, then, the null packets for padding are recorded in the section from the source packet next the source packet 70 to the border between the ECC block #4 and the ECC block #5.

When the ejection operation of the disk 12 is performed or the file division is performed in this state, first, the section from the border between the ECC block #4 and the ECC block #5 to the trailing end of the final source packet including the border is embedded with the padding data. Then, the null packets are sequentially recorded in the source packets subsequent to the final source packet including the border. When the file size becomes equal to a multiple of the data length of the island unit, the recording of the null packets is stopped and the file is closed. The trailing end of the null packet finally recorded corresponds to the end of the file.

The section from the trailing end of the null packet finally recorded to the trailing end of the ECC block #5 including the above null packets is not used as data. When the UDF file system is used, management information "empty extent" indicating that the section is not used is set for the section. The section that is not used has no data recorded therein and is in an unstable data state. The error correction coder 40 can perform the error correction coding regardless of the data state of the section that is not used.

The file division on the basis of the system requirements will now be briefly described. As described above, according to the embodiment of the present invention, the data streams created in the record units are sequentially added to one file in the record units. The file division is performed when any of (1) to (3) applies.

(1) When a predetermined attribute differs between the data stream in the record units to be added to the file and the data stream in the record units recorded in advance in the file
(2) When the recording of the data stream in the file causes the size of the file to exceed an upper limit of the file size supported in the file system
(3) When the value of the PTS of a picture to be recorded in one record unit exceeds a value that can be represented in the accuracy defined in the PTS The case (1) in which a predetermined attribute differs between the data stream in the record units added to the file and the data stream in the record units recorded in advance in the file will now be described. For example, when the recording of one record unit is completed and the recording of the next record unit is to be started, the control unit 20 refers to stream information concerning the record unit recorded in advance to compare the stream information with information currently set in the recording apparatus. If the comparison shows that information concerning, for example, the vertical or horizontal size of the image frame, the aspect ratio (4:3 or 16:9), the frame rate (such as 29.97 Hz or 59.94 Hz), the scanning method (interlace or progressive), or the closed caption of the video data differs between the stream information and the information currently set in the recording apparatus, the file division is performed. If the comparison shows that information concerning, for example, the encoding method (such as AC3 or PCM), the output method (such as 5.1 ch or 2 ch), the sampling frequency (such as 44.1 kHz or 48 kHz), the quantifying bit number (such as 16 bits or 24 bits), or the language code of the audio data differs between the stream information and the information currently set in the recording apparatus, the file division is performed.

The case (2) in which the recording of the data stream in the file causes the size of the file to exceed an upper limit of the file size supported in the file system will now be described. When the file recorded on the disk 12 is to be processed in other apparatuses, such as computer apparatuses, the format of the file recorded on the disk 12 needs to be supported in the file systems of the computer apparatuses. Adoption of a lower-level file system used in the computer apparatuses allows more computer apparatuses to read the file system. The lower-level file system is exemplified by File Allocation Table 16 (FAT16), used in Windows (registered trademark) which is one of the operation systems (OSs) adopted in computer apparatuses.

In the FAT16, the maximum size of one file is limited to 2 GB. In contrast, in the UDF, the maximum size of one file is much larger than 2 GB. If the size of the file in which the recording is performed according to the UDF exceeds 2 GB, this file cannot be processed in the FAT16. Accordingly, if the file size exceeds 2 GB, the file division is performed. The file size yielded when the alignment is performed on the basis of the island units is considered.

The case (3) in which the value of the PTS of a picture to be recorded in one record unit exceeds a value that can be represented in the accuracy defined in the PTS will now be described. The PTS has an accuracy in which a value measured at a clock rate of 90 kHz can be represented with a data length of 33 bits. In other words, the PTS can be used to represent up to 26 hours, 30 minutes, and 43.72 seconds in units of 90 kHz. If the recording time of one record unit exceeds 26 hours, 30 minutes, and 43.72 seconds, the file division is performed.

An alignment process used when recording is stopped, a process of restarting writing of data in the file where the recording has been stopped and an alignment process used when the file division is performed on the basis of the system requirements, and an alignment process used when the disk 12 is ejected will now be described in detail with reference to flowcharts shown in FIGS. 6 to 8, respectively.

Figure 6:
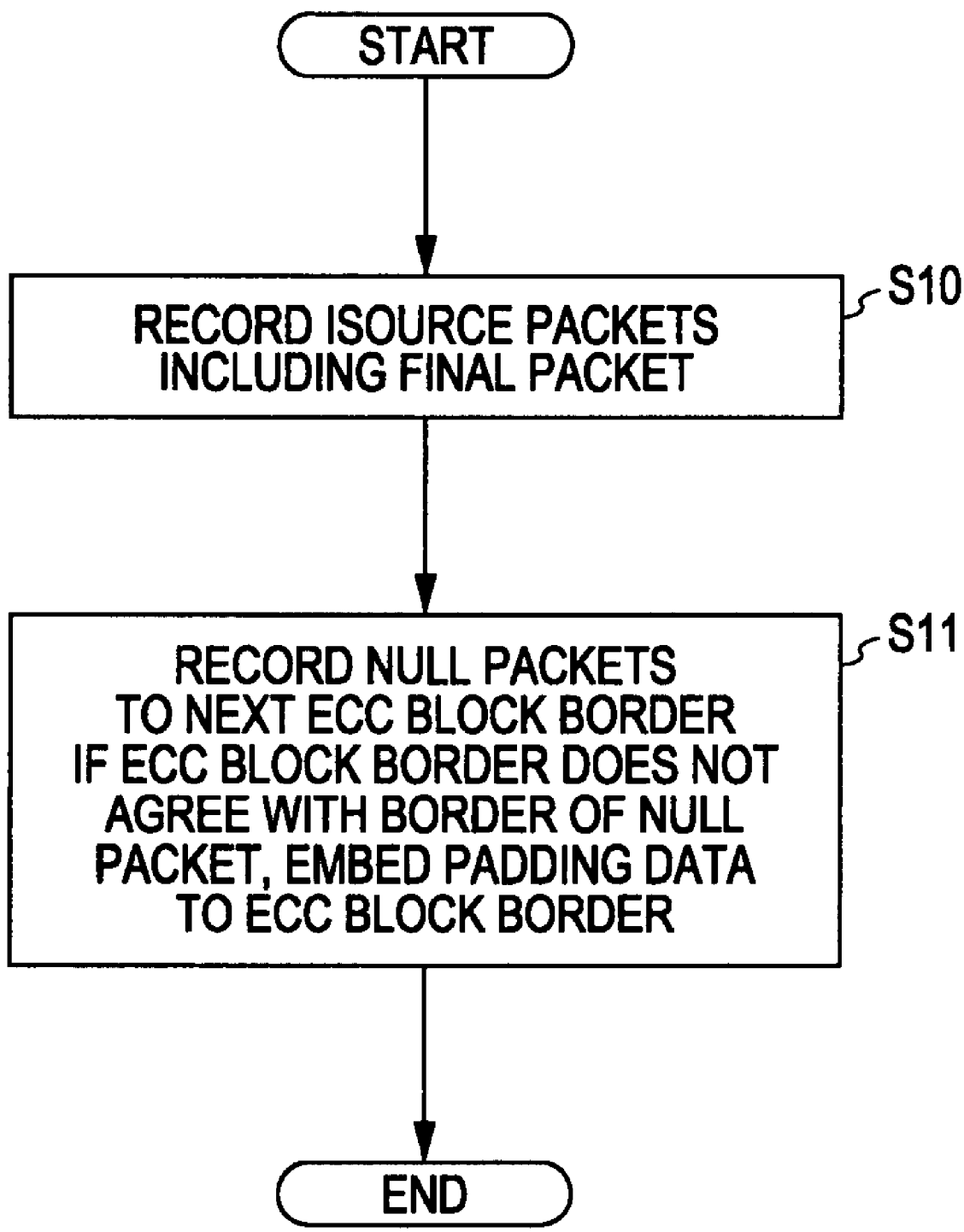
FIG. 6 is a flowchart showing an example of the alignment process used when recording is stopped.

FIG. 6 is a flowchart showing an example of the alignment process used when recording is stopped. In Step S10, the process records source packets including the final data at the recording stop position on the disk 12. For example, the control unit 20 stops the encoding operations in the video encoder 31 and the audio encoder 34 in response to the recording stop operation with the UI unit 21. The MUX 32 stores the video data that is finally encoded by the video encoder 31 in response to the recording stop operation in the source packet. This source packet is supplied to the disk drive 11 through the stream buffer 35 and is recorded on the disk 12.

The control unit 20 monitors the MUX 32 to determine whether the data is stored in the source packet to the trailing end thereof when the MUX 32 stores the data at the recording stop position in the source packet.

Referring back to FIG. 6, in Step S11, the process embeds the padding data in the section from the recording stop position in Step S10 to the border between the ECC blocks (refer to FIG. 3B). Then, the process temporarily closes the file.

If the control unit 20 determines that the video data is not stored in the source packet including the data at the recording stop position to the trailing end thereof, the control unit 20 embeds the padding data in the section from the recording stop position in the source packet to the trailing end of the source packet and, then, sequentially records the null packets in the section from the source packet next to the source packet including the data at the recording stop position to the border between ECC blocks. If the border between ECC blocks does not agree with the trailing end of the final null packet, the control unit 20 embeds the padding data in the null packet including the border between the ECC blocks to the border between the ECC blocks in the null packet.

The null packet is created by the MUX 32 under the control of the control unit 20. For example, the MUX 32 embeds data having a value "0" in the payload of the TS packet and sets the PID to a predetermined value to create a header of the TS packet. The MUX 32 adds the created header having a data size of four bytes to the TS packet to create a source packet, which is a null packet.

Practically, Steps S10 and S11 are performed in the memory and the data is recorded on the disk 12 in units of the ECC blocks.

For example, the MUX 32 creates the source packet 70 which includes the data at the recording stop position in Step S10 and in which the section from the recording stop position to the trailing end of the source packet 70 is embedded with the padding data. The source packet 70 is supplied to the error correction coder 40 through the stream buffer 35 and the supplied source packet 70 is written in the memory in the error correction coder 40. Similarly, the MUX 32 creates the null packets in Step S11. The created null packets are supplied to the error correction coder 40 through the stream buffer 35 and the supplied null packets are written in the memory in the error correction coder 40 as data for the source packets subsequent to the source packet 70. Part of the data which cannot be fitted into the ECC block is, for example, discarded. The error correction coder 40 performs the error correction coding to the data written in the memory and supplies the data subjected to the error correction coding to the recording processor 41 in units of the ECC blocks.

Figure 7:
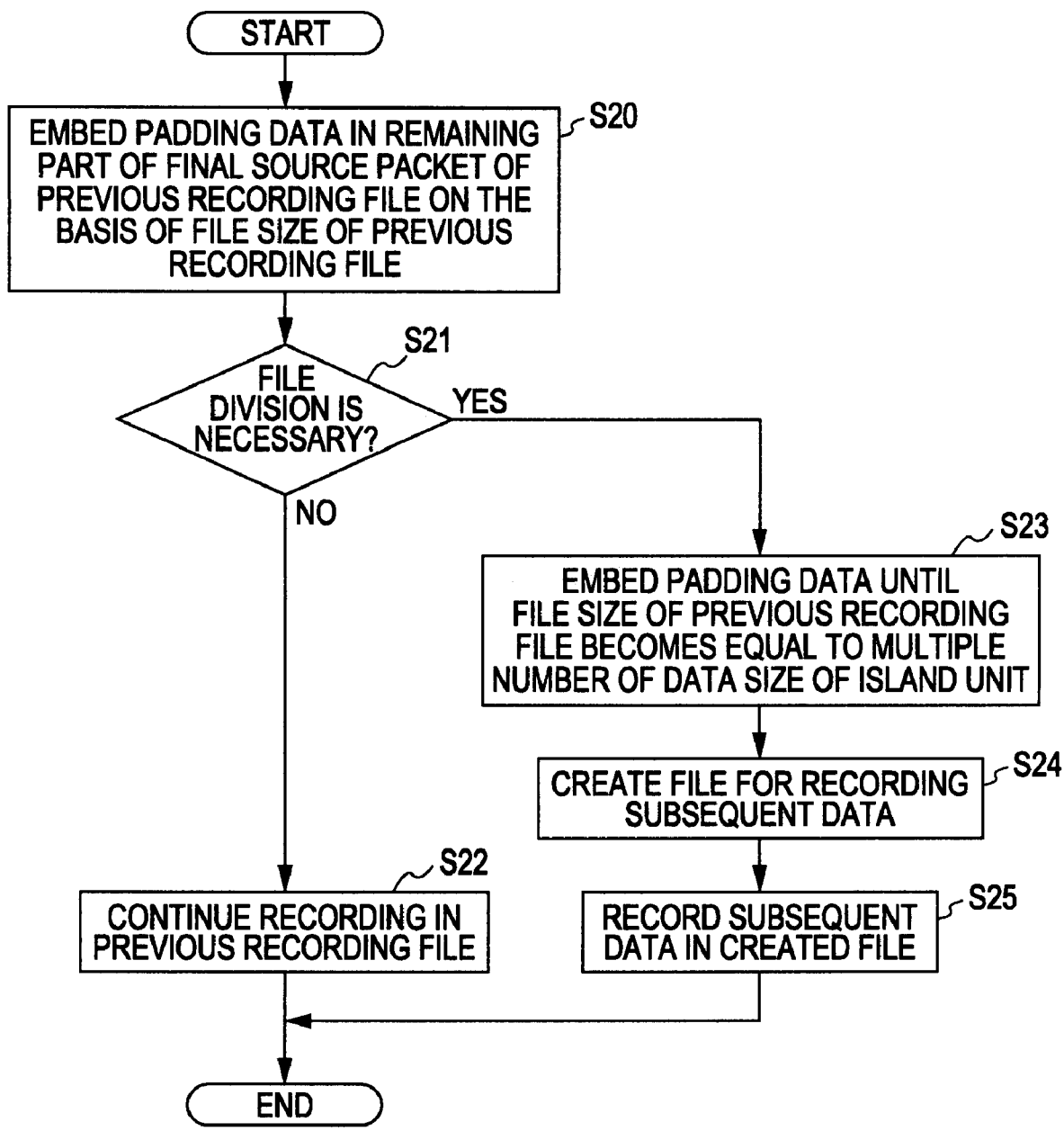
FIG. 7 is a flowchart showing an example of the process of restarting writing of data in a file where the recording was stopped.

FIG. 7 is a flowchart showing an example of the process of restarting writing of data in the file where the recording was stopped. In Step S20, the process determines the size of the file in which the writing of data is to be restarted, that is, of the file created in the previous recording operation and embeds the padding data in the remaining section from the recording stop position in the final source packet of the file created in the previous recording operation to the trailing end of the final source packet on the basis of the determined file size.

For example, the control unit 20 acquires the size of the file created in the previous recording operation on the basis of the file system and divides the acquired file size by the data size (192 bytes) of the source packet. The control unit 20 embeds the padding data corresponding to the difference between the residue calculated by the division and the data size of the source packet in the remaining section from the recording stop position in the final source packet of the file created in the previous recording operation to the trailing end of the final source packet.

In Step S21, the process determines whether the file division on the basis of the system requirements is necessary. If the process determines that the file division is not necessary, the process goes to Step S22 to record the subsequent recording data in the file created in the previous recording operation. Specifically, in Step S22, the process sequentially records the recording data in source packets subsequent to the source packet embedded with the padding data in Step S20, as described above with reference to FIGS. 4A and 4B.

If the process determines in Step S21 that the file division is necessary, the process goes to Step S23 to perform the alignment on the basis of the island units in the file created in the previous recording operation. Specifically, in Step S23, the process records the null packets in the section from the source packet next to the source packet embedded with the padding data in Step S20 to the source packet where the file size becomes equal to a multiple of the data size of the island unit, as described above with reference to FIGS. 5A and 5B. For example, the control unit 20 may calculate the number of the necessary null packets in advance on the basis of the file size before the null packets are recorded and the data size of the island unit.

When the file size becomes equal to a multiple of the data size of the island unit, the process closes the file. In Step S24, the process creates a new file in which the subsequent data is to be recorded. In Step S25, the process records the subsequent data in the created new file.

Although the determination of whether the file division is necessary in Step S21 is performed after the embedding of the padding data in the final source packet in the file created in the previous recording operation in Step S20, the embodiment of the present invention is not limited to this example. Whether the file division is necessary may be determined before the process in FIG. 7 is started.

For example, when the file division is performed because a predetermined attribute differs between the data stream in the record units to be added to the file and the data stream in the record units recorded in the file in advance, that is, in the case of (1) described above, the predetermined attribute is changed in the recording apparatus in response to an operation with the UI unit 21 after the recording was stopped before the next recording is started. When the file division is performed on the basis of an upper limit of the file size and when the file division is performed on the basis of an upper limit of the PTS in one record unit, that is, in the cases (2) and (3) described above, the file division is performed when the file created in the previous recording operation is closed.

Practically, the embedding of the padding data in Steps S20 and S23 is performed in the memory, as in Steps S10 and S11, and the data is recorded on the disk 12 in units of the ECC blocks.

In Step S20, for example, the MUX 32 generates the padding data corresponding to the difference between the residue calculated in the division and the data size of the source packet and supplies the generated padding data to the error correction coder 40 through the stream buffer 35. The supplied padding data is written in the memory in the error correction coder 40.

In Step S23, for example, the MUX 32 generates the null packets and supplies the generated null packets to the error correction coder 40 through the stream buffer 35. The supplied null packets are written in the memory in the error correction coder 40 after the padding data written in Step S20.

In the alignment process used when the file division is performed on the basis of the upper limit of the file size, that is, in the case of (2) described above, the total data size of the null packets recorded for the alignment based on the island units may be estimated to determine a time when the file division is performed. For example, the data size given by subtracting the data size of the island unit from the upper limit of the file size on the basis of the file system is determined to be the upper limit of the file size in the file division. In this case, the file division is performed if the control unit 20 determines that the recording of the source packets corresponding to the next ECC block causes the file size to exceed the estimated upper limit of the file size on the basis of the information supplied from the MUX 32.

In the alignment process used when the file division is performed on the basis of the upper limit of the PTS, that is, in the case of (3) described above, the file division may be performed if the control unit 20 determines that the upper limit of the PTS will be exceeded in the next PTS packet on the basis of information supplied from the MUX 32 because the null packet has no PTS.

Figure 8:
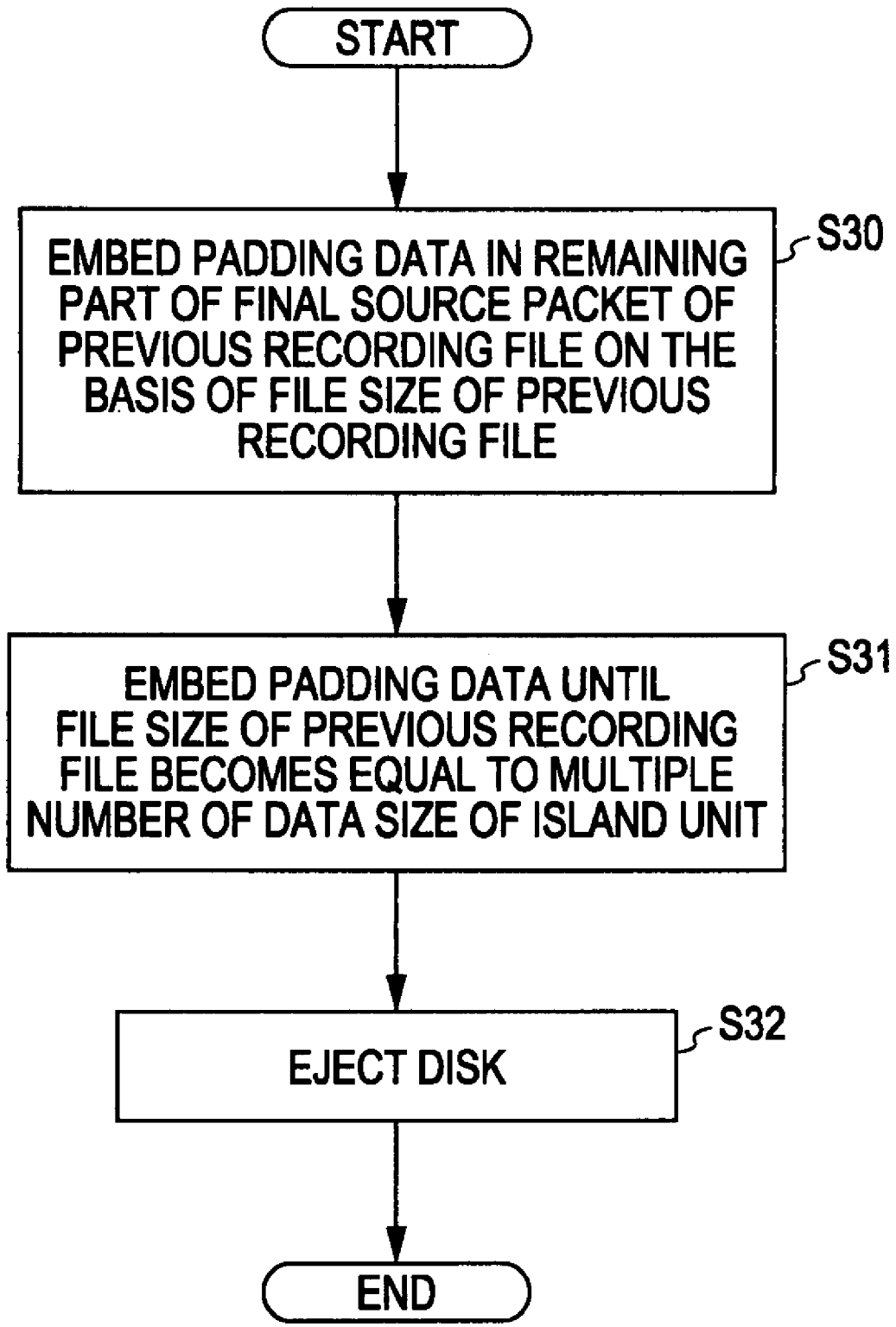
FIG. 8 is a flowchart showing an example of the alignment process used when the disk is ejected.

FIG. 8 is a flowchart showing an example of the alignment process used when the disk 12 is ejected. The alignment process used when the disk 12 is ejected is basically similar to the alignment process used when the file division is performed on the basis of the system requirements. For example, when the ejection button provided on the recording apparatus is pressed, the control unit 20 controls the components in the recording apparatus so as to eject the disk 12 from the recording apparatus. First, the control unit 20 controls the components so as to read out the stored source packets from the stream buffer 35, to supply the readout source packets to the disk drive 11, and to write the supplied source packets in the disk 12 (this step is not shown in FIG. 8).

In Step S30, the process determines the size of the file created in the previous recording operation and embeds the padding data in the section from the recording stop position in the final source packet in the file created in the previous recording operation to the trailing end of the final source packet on the basis of the determined file size. In Step S31, the process performs the alignment based on the island units. Specifically, as described above with reference to FIGS. 5A and 5B, the null packets are recorded in the section from the source packet next to the source packet embedded with the padding data in Step S30 to the source packet where the file size becomes equal to a multiple of the data size of the island unit.

In the recording of the null packets in Step S31, the processing in units of the source packets is performed in the memory in the MUX 32, the result of the processing is written in the memory in the error correction coder 40, and the data is recorded on the disk 12 in units of the ECC blocks, as in FIGS. 6 and 7.

When the file size becomes equal to a multiple of the data size of the island unit, the process closes the file. In Step S32, the control unit 20 controls a mechanism (not shown) for ejecting the disk 12 from the recording apparatus so as to eject the disk 12.

Although not shown, the stream information corresponding to the stream file recorded on the disk 12 is recorded on the disk 12 as the stream information file under the control of the control unit 20 after the null packets are recorded in Step S31.

Figure 9:
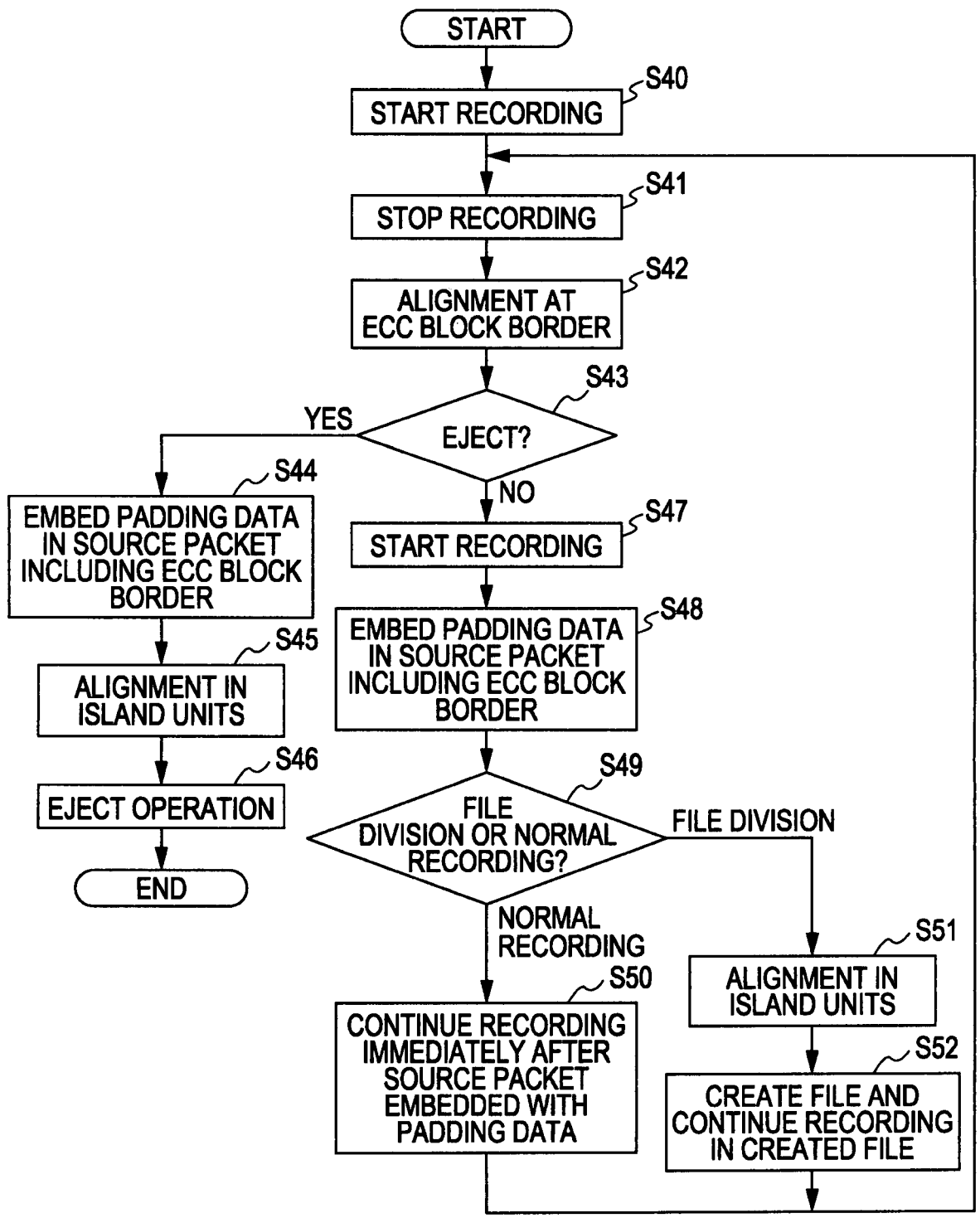
FIG. 9 is a flowchart showing an example of the relationship between the processes when recording is stopped, when recording is started after the recording was stopped, when the disk is ejected, and when the file division is performed.

FIG. 9 is a flowchart showing an example of the relationship between the processes used when recording is stopped, when recording is restarted after the recording was stopped, when the disk 12 is ejected, and when the file division is performed. Referring to FIG. 9, in Step S40, the process loads the disk 12 in the recording apparatus and starts recording of video data and audio data on the disk 12 in response to, for example, a user operation with the UI unit 21.

In Step S41, the process stops the recording by a recording stop operation by the user with the UI unit 21 or for the file division on the basis of the system requirements. The stop of the recording for the file division on the basis of the system requirements in Step S41 corresponds to the case (2) in which the file size exceeds the upper limit of the file size supported in the file system or the case (3) in which the value of the PTS in one record unit exceeds the upper limit.

After the recording is stopped in Step S41, in Step S42, the process performs the alignment at the border between ECC blocks. In the alignment in Step S42, as described above with reference to FIGS. 3A, 3B, and 6, the section from the recording stop position to the trailing end of the source packet including the data at the recording stop position is embedded with the padding data and, then, the null packets are sequentially recorded in the section from the source packet next to the source packet including the data at the recording stop position to the trailing end of the ECC block including the source packet including the data at the recording stop position. Since the recording on the disk 12 is performed in units of the ECC blocks, the source packet including the trailing end of the above ECC block is embedded with the padding data only to the trailing end of the ECC block.

In Step S43, the process determines whether the disk 12 is to be ejected. If the process determines that the disk 12 is to be ejected, the process goes to Step S44. For example, when the recording is stopped in Step S41 in response to the recording stop operation by the user with the UI unit 21, the disk 12 is ejected after the recording is stopped.

In Step S44, the process embeds the padding data in the section from the border between the ECC blocks to trailing end of the source packet including the border between the ECC blocks. The alignment has been performed at the border between the ECC blocks in Step S42. In Step S45, the process performs the alignment based on the island units. Specifically, in Steps S44 and S45, the section from the border between the ECC blocks to the trailing end of the source packet including the border is embedded with the padding data and, then, the null packets are sequentially recorded in the section from the source packet next to the source packet including the border to the source packet where the file size becomes equal to a multiple of the data size of the island unit, as described above with reference to FIGS. 5A, 5B, and 8.

After the alignment is performed on the basis of the island units, in Step S46, the process performs the ejection operation of the disk 12 to eject the disk 12 from the recording apparatus.

If the process determines in Step S43 that the disk 12 is not to be ejected, the process goes to Step S47 to start the recording.

For example, if the recording is stopped in Step S41 due to a user operation with the UI unit 21, in Step S47, the recording is started in response to a user operation with the UI unit 21. The settings for the video data and/or the audio data to be recorded may be changed, for example, in response to operations with the UI unit 21. As for the video data, the settings of the frame size, the aspect ratio, the frame rate, and the scanning method may be changed. When the recording apparatus is a video camera and the shooting mode is switched between a high definition (HD) shooting mode and a standard definition (SD) shooting mode, multiple settings relating the switching may be collectively changed. The same applies to the audio data.

If the recording is stopped in Step S41 due to the upper limit of the file size or that of the PTS value, the starting of the recording in Step S47 is automatically performed in the recording apparatus.

After the recording is started in Step S47, in Step S48, the process embeds the padding data in the section from the border between the ECC blocks to trailing end of the source packet including the border between the ECC blocks. The alignment has been performed at the border between the ECC blocks in Step S42.

In Step S49, the process determines whether the file division is necessary in the recording started in Step S47. Specifically, the process determines in Step S49 whether the source packets generated in the recording started in Step S47 is added to the file in which the source packet has been recorded when the recording was stopped in Step S41 or a new file is created to record the above source packets in the new file.

If the process determines in Step S49 that the file division is not necessary in the recording started in Step S47, the process goes to Step S50 to restart the recording stopped in Step S41.

For example, if the starting of the recording in Step S47 is the normal starting of the recording, for example, the recording is started in response to an operation with the UI unit 21 and if the recording settings are not changed so that the file division on the basis of the system requirements is necessary before the recording is started in Step S47 since the recording has been stopped in Step S41, the process determines in Step S49 that the source packets generated in the recording started in Step S47 can be added to the file in which the source packets has been recorded when the recording was stopped in Step S41 and goes to Step S50. In Step S50, the source packets including the recording data are sequentially recorded after the source packet embedded with the padding data to the trailing end thereof in Step S48, as described above with reference to FIGS. 4A, 4B, and 7.

If the process determines in Step S49 that the file division is necessary in the recording started in Step S47, the process goes to Step S51 to perform the alignment based on the island units.

For example, if the recording is stopped in Step S41 due to the upper limit of the file size or the upper limit of the PTS value or if the recording settings are changed so that the file division on the basis of the system requirements is necessary before the recording is started in Step S47 since the recording has been stopped in Step S41, the process determines in Step S49 that the file division is necessary and the source packets are recorded in the file newly created and goes to Step S51. Also if the recording settings are changed during the recording so that the file division on the basis of the system requirements is necessary, it is necessary to perform the file division.

In Step S51, the process performs the alignment based on the island units in the data in which the source packet including the border between the ECC blocks is embedded with the padding data to the trailing end thereof in Step S48. In Steps S48 and S51, the section from the border between the ECC blocks to the trailing end of the source packet including the border is embedded with the padding data and, then, the null packets are sequentially recorded in the section from the trailing end of the source packet including the border to the source packet where the file size becomes equal to a multiple of the data size of the island unit, as described above with reference to FIGS. 5A, 5B, and 8.

After the alignment based on the island units is performed, in Step S52, the process creates a new file and records the source packets in the new file. If the file division is automatically performed during the recording on the basis of the data, such as the upper limit of the file size or the upper limit of the PTS value, the amount of which increases during the recording, the recording is appropriately controlled so that the video data to be recorded in the new file and the video data stored in the file in which the recording was stopped in Step S41 and which was closed can be seamlessly displayed.

As described above, according to the embodiment of the present invention, after the recording is stopped, the alignment at the border between the ECC blocks is performed and, then, the padding data is embedded in the source packet including the border to the trailing end thereof. When the source packets are added to the same file, the source packets are additionally recorded after the source packet including the border between the ECC blocks. When the file division is performed, the source packets are recorded in the section from the source packet next to the source packet including the border to the source packet where the file size becomes equal to a multiple of the data size of the island unit and the file is closed.

Accordingly, it is possible to achieve both the alignment based on the ECC blocks, which are the data units in the recording in the disk drive 11, and the alignment based on the source packets output from the signal processing unit 10. In addition, the amount of the padding data used in one record unit can be set to a data size smaller than the data size of the ECC block, for example, to 32 KB or less. Since the amount of the padding data is restricted, the degradation in the image quality during the seamless recording and during the playback can be reduced. Furthermore, since the blank area where no data is recorded occurs only in the posterior of one file, it is possible to prevent an increase in the amount of the management information for the blank area in the file system and an increase in the amount of processing for creation or readout of the management information.

A first modification of the embodiment of the present invention will now be described. The above embodiment of the present invention is applied to the separate recording apparatus (refer to FIG. 1). In contrast, the first modification of the embodiment of the present invention is applied to a video camera apparatus. The video camera apparatus includes an imaging device and an optical system through which light reflected from a subject is incident on the imaging device. The video camera apparatus records video data on a recording medium on the basis of an imaging signal captured by the imaging device.

Figure 10:
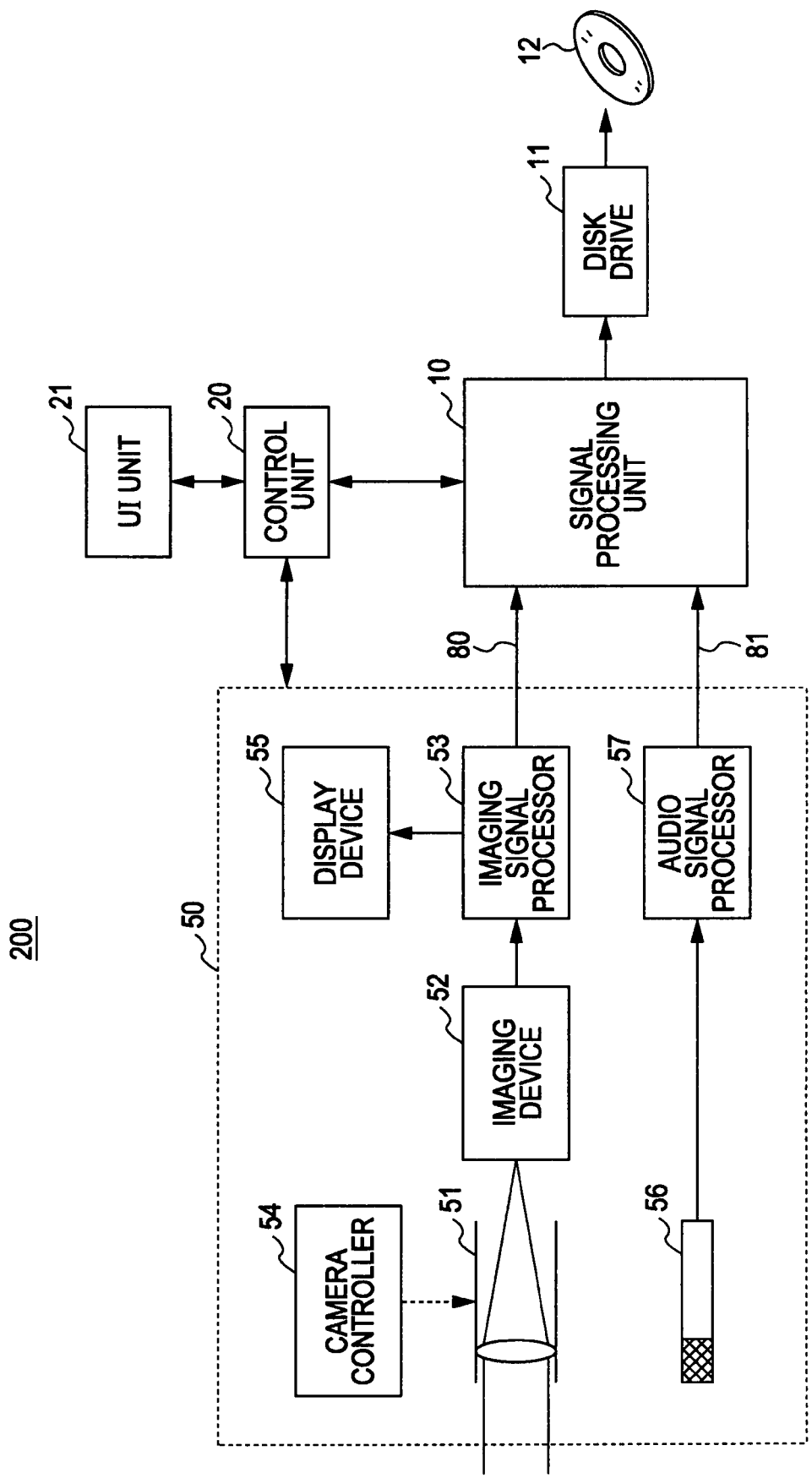
FIG. 10 is a block diagram showing an example of the configuration of a video camera apparatus according to a first modification of the embodiment of the present invention.

FIG. 10 is a block diagram showing an example of the configuration of a video camera apparatus 200 according to the first modification of the embodiment of the present invention. In the video camera apparatus 200, a recording system including a signal processing unit 10, a disk drive 11, a control unit 20, and a UI unit 21 has a configuration similar to that of the recording apparatus described above with reference to FIG. 1. Accordingly, the same reference numerals are used in FIG. 10 to identify the same components shown in FIG. 1. A description of such components is omitted herein.

Referring to FIG. 10, a camera unit 50 includes an optical system 51, an imaging device 52, an imaging signal processor 53, a camera controller 54, and a display device 55 as components relating to video signals. The camera unit 50 includes a microphone (MIC) 56 and an audio signal processor 57 as components relating to audio signals. The control unit 20 supplies and receives various control signals and data to and from the components in the camera unit 50 to control the operation of the camera unit 50. The control unit 20 also controls the operation of the camera unit 50 on the basis of a control signal supplied from the UI unit 21 in response to a user operation.

When the recording apparatus is configured as the video camera apparatus 200, the recording start operation and the recording stop operation are generally instructed with a single recording switch provided in the UI unit 21. Each time the recording switch is pressed, start of recording and stop of recording are alternately instructed. In the video camera apparatus 200, a disk recording medium, such as a DVD-R or a Blu-ray Disc, is applied to a disk 12.

The configuration of the video camera apparatus 200 is not limited to the one described above and the video camera apparatus 200 may include a hard disk drive (not shown) that is used as the disk 12. Alternatively, a non-volatile semiconductor memory capable of storing data corresponding to a predetermined continuous recording time may be included in or removably attached to the video camera apparatus 200 and the non-volatile semiconductor memory may be used as the disk 12.

In the camera unit 50, the optical system 51 is provided with a lens system that leads light reflected from the subject to the imaging device 52, an aperture adjusting mechanism, a focusing adjusting mechanism, a zoom mechanism, a shutter mechanism, and so on. The operations of the aperture adjusting mechanism, the focusing adjusting mechanism, the zoom mechanism, and the shutter mechanism are controlled by the camera controller 54 on the basis of the control signals supplied from the control unit 20.

The imaging device 52 is, for example, a charge coupled device (CCD). The imaging device 52 converts the light radiated through the optical system 51 into an electrical signal by photoelectric conversion and performs predetermined signal processing to the electrical signal to output an imaging signal. The imaging signal processor 53 performs predetermined signal processing to the imaging signal supplied from the imaging device 52 to output baseband digital video data.

For example, the imaging signal processor 53 samples only signals including image information from the imaging signal supplied from the imaging device 52 with a correlated double sampling (CDS) circuit, removes any noise from the signal, and adjusts the gain with an automatic gain control (AGC) circuit. The imaging signal processor 53 converts the signal into a digital signal by analog-to-digital conversion. The imaging signal processor 53 performs signal processing for detection to the digital signal and extracts color components of red (R), green (G), and blue (B). The imaging signal processor 53, then, performs γ correction and white balance control and finally outputs one-baseband digital video data.

The imaging signal processor 53 supplies information concerning the imaging signal supplied from the imaging device 52 to the control unit 20. The control unit 20 generates a control signal used for controlling the optical system 51 on the basis of the supplied information and supplies the generated control signal to the camera controller 54. The camera controller 54 controls, for example, the focusing adjusting mechanism and the aperture adjusting mechanism on the basis of the control signal.

Furthermore, the imaging signal processor 53 generates a video signal to be displayed in the display device 55 using, for example, a liquid crystal display (LCD) as a display element on the basis of the imaging signal supplied from the imaging device 52.

The microphone 56 collects sounds around the video camera apparatus 200, converts each sound into an electrical signal, and outputs an audio signal. The audio signal output from the microphone 56 is supplied to the audio signal processor 57. The audio signal processor 57 causes the supplied audio signal to pass through a limiter, performs the analog-to-digital conversion to the audio signal to generate digital audio data. The audio signal processor 57, then, performs predetermined audio signal processing, such as noise reduction and tone control, to the digital audio data to output one-baseband digital audio data.

The baseband digital video data supplied from the imaging signal processor 53 is supplied to a terminal 80 of the signal processing unit 10. The baseband digital audio data supplied from the audio signal processor 57 is supplied to a terminal 81 of the signal processing unit 10.

When the disk 12 is loaded in the video camera apparatus 200 and the recording switch in the UI unit 21 is pressed, recording of the video data and audio data yielded by the image pickup by the camera unit 50 on the disk 12 is started in accordance with, for example, the process described above with reference to FIG. 9. Specifically, when the recording switch is pressed, a control signal instructing the start of the recording is supplied from the UI unit 21 to the control unit 20. The recording of the baseband digital video data and audio data supplied from the camera unit 50 on the disk 12 is started under the control of the control unit 20 (Step S40 in FIG. 9).

As described above, under the control of the control unit 20, the operations of the video encoder 31 and the audio encoder 34 in the signal processing unit 10 are started, the video data and the audio data are compressed and encoded by the video encoder 31 and the audio encoder 34, respectively, and elementary streams of the video data and the audio data are output. The elementary streams of the video data and the audio data are packetized into source packets by the MUX 32 in the signal processing unit 10 and are multiplexed in units of the source packets to generate a data stream. The data stream is supplied to the disk drive 11 through the stream buffer 35 in the signal processing unit 10 and is written in the memory in the error correction coder 40 in the disk drive 11 to be subjected to the error correction coding. The data subjected to the error correction coding is output from the error correction coder 40 in units of the ECC blocks to generate recording signals that are recorded on the disk 12 as files.

When the recording switch in the UI unit 21 is pressed, the recording is stopped and the alignment is performed at the border between ECC blocks (Steps S41 and S42 in FIG. 9). If the ejection operation is performed to eject the disk 12 from the video camera apparatus 200, the data in which the null packets are used to perform the alignment on the basis of the island units is added to the file on the disk 12 and predetermined stream information is recorded on the disk 12. Then, the disk 12 is ejected from the video camera apparatus 200 (Steps S45 and S46 in FIG. 9).

After the recording switch in the UI unit 21 is pressed to stop the recording, if the recording switch is pressed again to restart the recording without ejecting the disk 12 and without changing the shooting mode, the padding data is embedded in the source packet including the border between the ECC blocks to the trailing end thereof (Step S48 in FIG. 9). Then, the source packets are sequentially recorded in the same file after the source packet including the border between the ECC blocks (Step S50 in FIG. 9).

In contrast, after the recording switch in the UI unit 21 is pressed to stop the recording, if the shooting mode is changed without ejecting the disk 12 and the recording switch is pressed again, it is necessary to perform the file division in order to record the video data and audio data involved in the restart of the recording on the disk 12. Accordingly, after the padding data is embedded to the trailing end of the source packet including the border between the ECC blocks, the null packets are used to perform the alignment on the basis of the island units and the recording data is recorded on the disk 12 (Step S51 in FIG. 9). Then, a new file is created and the source packets of the video data and audio data involved in the restart of the recording are recorded in the new file (Step S52 in FIG. 9).

If the recording is continued for a predetermined time since the first recording start operation and the size of the file in which the source packets of the video data and audio data are recorded exceeds the upper limit of the file size or the value of the PTS of the video data recorded in the file exceeds the upper limit, it is necessary to perform the file division and to continue the recording in accordance with Steps S48, S51, and S52, as in the above case. At this time, the file in which the recording data is being recorded is closed so that the file size or the value of the PTS does not exceed the upper limit. In addition, a new file is created, and the recording is controlled so that the video data in the closed file and the video data to be recorded in the new file are seamlessly played back.

A second modification of the embodiment of the present invention will now be described. According to the second modification of the embodiment of the present invention, a communication unit allowing communication with another apparatus is provided in the recording apparatus according to the embodiment of the present invention. The disk drive 11 in the recording apparatus is used as an external storage device of the other apparatus connected to the recording apparatus via the communication unit.

Figure 11:
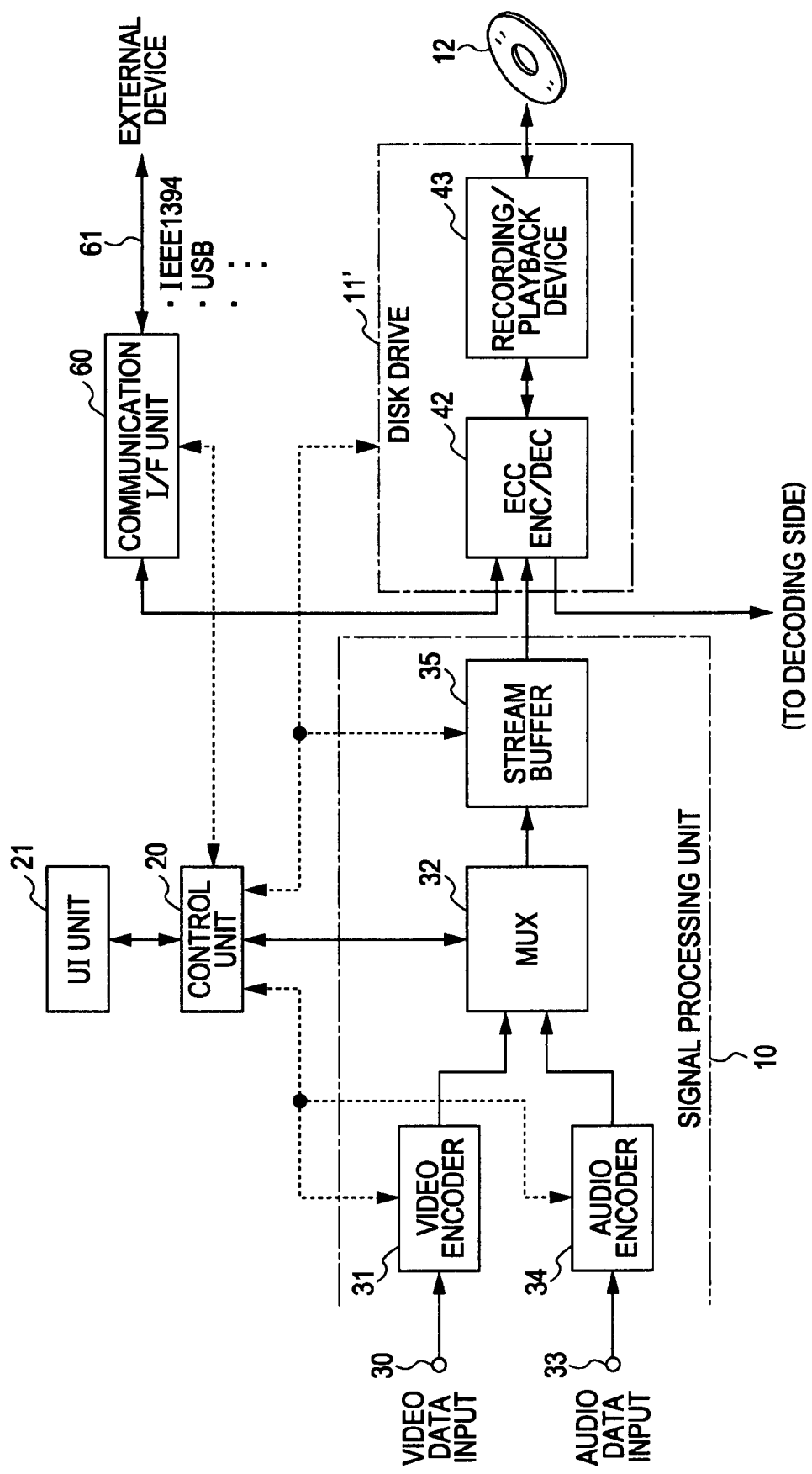
FIG. 11 is a block diagram showing an example of the configuration of a recording apparatus according to a second modification of the embodiment of the present invention.

FIG. 11 is a block diagram showing an example of the configuration of a recording apparatus according to the second modification of the embodiment of the present invention. Referring to FIG. 11, a communication interface (I/F) unit 60 for data communication with another apparatus is provided in the recording apparatus according to the embodiment of the present invention described above with reference to FIG. 1. The same reference numerals are used in FIG. 11 to identify the same components shown in FIG. 1. A description of such components is omitted herein.

The communication I/F unit 60 is capable of data communication with the other apparatus connected to the recording apparatus via a certain communication cable 61 under the control of the control unit 20. The communication I/F unit 60 uses, for example, Universal Serial Bus (USB) or Institute of Electrical and Electronic Engineers 1394 (IEEE 1394) as the communication interface to perform the data communication.

A disk drive 11' includes an ECC encoder-decoder 42 and a recording-playback device 43. The ECC encoder-decoder 42 performs the error correction coding to the recording data, such as the source packet, supplied from the signal processing unit 10 in units of the ECC blocks during the recording. The ECC encoder-decoder 42 decodes the error correction code of the playback data supplied from the recording-playback device 43 and performs the error correction to the decoded data during the playback. The data subjected to the error correction is supplied to a decoding block (not shown).

The recording-playback device 43 performs the recording encoding to the data supplied from the ECC encoder-decoder 42 and performs the modulation to the data subjected to the recording encoding to output a recording signal during the recording. The recording-playback device 43 demodulates a playback signal read from the disk 12 and decodes the recording code in the demodulated digital signal to provide playback data during the playback. The playback data is supplied to the ECC encoder-decoder 42.

With the recording apparatus having the above configuration, the other apparatus connected the recording apparatus via the communication I/F unit 60 and the communication cable 61 can communicate with the control unit 20 via the communication cable 61 and the communication I/F unit 60 to control the disk drive 11'. For example, the other apparatus can handle the disk drive 11' as if it were an external drive device connected the other apparatus. In this case, the other apparatus can communicate with the control unit 20 to read and write data from and in the disk 12 on the basis of the file system of the other apparatus.

Figure 12:
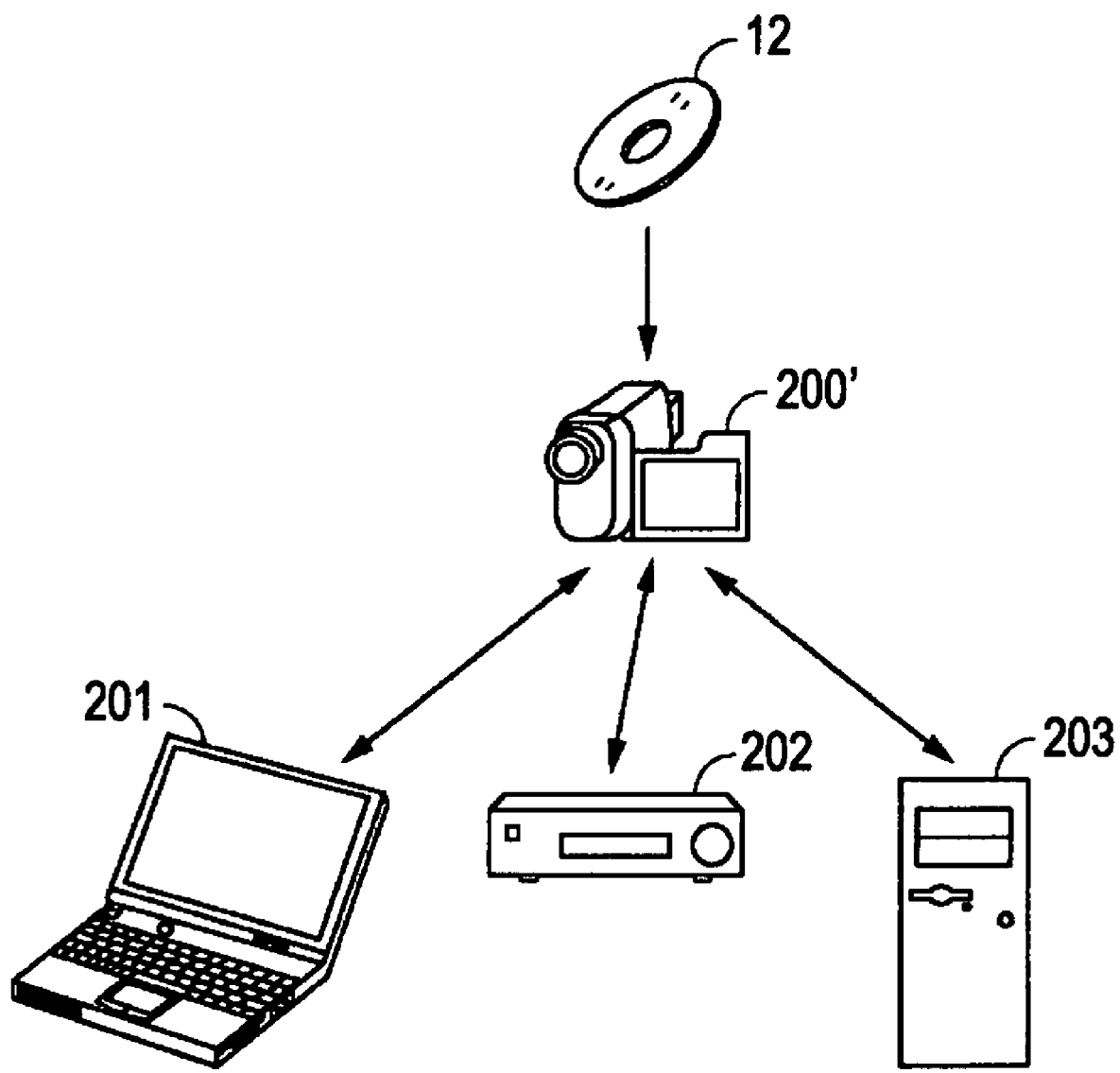
FIG. 12 illustrates an example of usage of the recording apparatus according to the second modification of the embodiment of the present invention.

FIG. 12 illustrates an example of usage of the recording apparatus according to the second modification of the embodiment of the present invention. As shown in FIG. 12, the video camera apparatus 200 according to the first modification of the embodiment of the present invention, described above with reference to FIG. 10, is provided with the communication I/F unit 60 to configure a video camera apparatus 200'.

For example, it is assumed that the video camera apparatus 200' is connected to a computer apparatus 201, such as a personal computer (PC), via the communication cable 61. The computer apparatus 201 is denoted as a PC 201 in FIG. 12. The PC 201 is provided with a communication interface corresponding to the communication I/F unit 60 provided in the video camera apparatus 200'. The PC 201 recognizes the entire video camera apparatus 200' as a disk drive device to write data on the disk 12 and to read out the data recorded on the disk 12. The PC 201 accesses the disk 12 on the basis of the file system of the PC 201 to read and write a file.

For example, a video editing application supporting the video format applied to the video camera apparatus 200' is installed in the PC 201. Video data and audio data shot by the video camera apparatus 200' and recorded on the disk 12 can be transferred to the PC 201 where the video data and the audio data can be edited. The edited video data and audio data can be transferred to the video camera apparatus 200' and can be recorded on the disk 12.

Alternatively, it is assumed that a recorder 202 is provided with a communication interface corresponding to the communication I/F unit 60 in the video camera apparatus 200'. The recorder 202 records video data and audio data on a predetermined recording medium. The recorder 202 can be connected to the video camera apparatus 200' via the communication cable 61 to, for example, control the video camera apparatus 200' and access the disk 12.

If the recorder 202 supports the recording format applied to the video camera apparatus 200', the recorder 202 can read out a file recorded on the disk 12 loaded in the video camera apparatus 200' to record the readout file on the recording medium of the recorder 202. Similarly, the recorder 202 can transfer a file recorded on the recording medium of the recorder 202 to the video camera apparatus 200' to record the file on the disk 12.

Alternatively, it is assumed that an audio-video (AV) server 203 supporting the communication I/F unit 60 provided in the video camera apparatus 200' is connected to the video camera apparatus 200' via the communication cable 61. The AV server 203 has a configuration similar to that of the computer apparatus 201. The AV server 203 includes a high-capacity recording medium suitable for storing a larger amount of video data and audio data. In this case, the AV server 203 is connected to the video camera apparatus 200' via the communication cable 61. A file recorded on the disk 12 loaded in the video camera apparatus 200' is transferred to the AV server 203 and is stored in the recording medium of the AV server 203.

When the video camera apparatus 200' is connected to another apparatus and the disk drive 11' in the video camera apparatus 200' is used as if the disk drive 11' were an external drive of the other apparatus, it is necessary to allow data recorded on the disk 12 to be accessed from the other apparatus.

Figure 13:
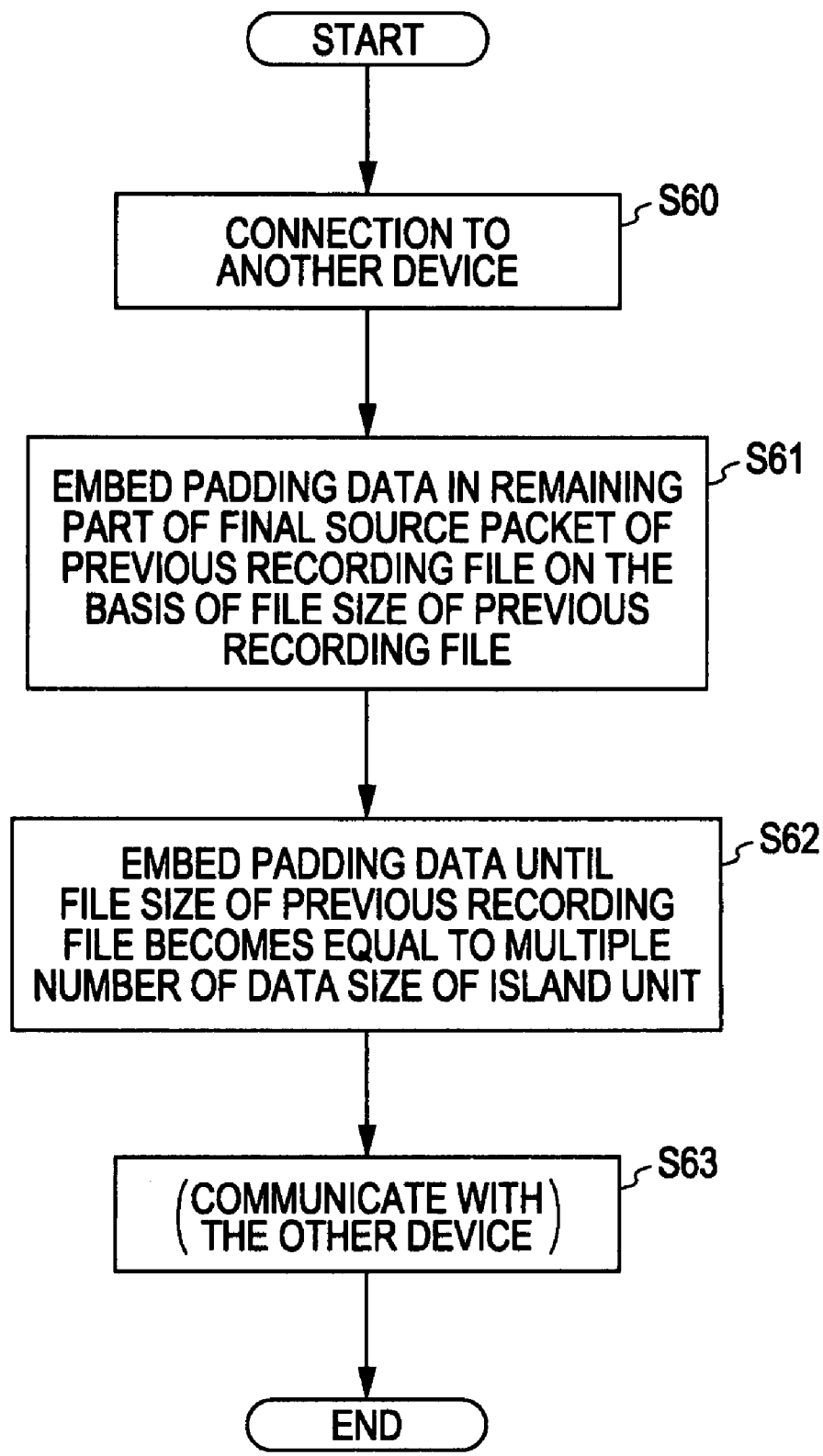
FIG. 13 is a flowchart showing an example of an alignment process according to the second modification of the embodiment of the present invention.
Figure 14:
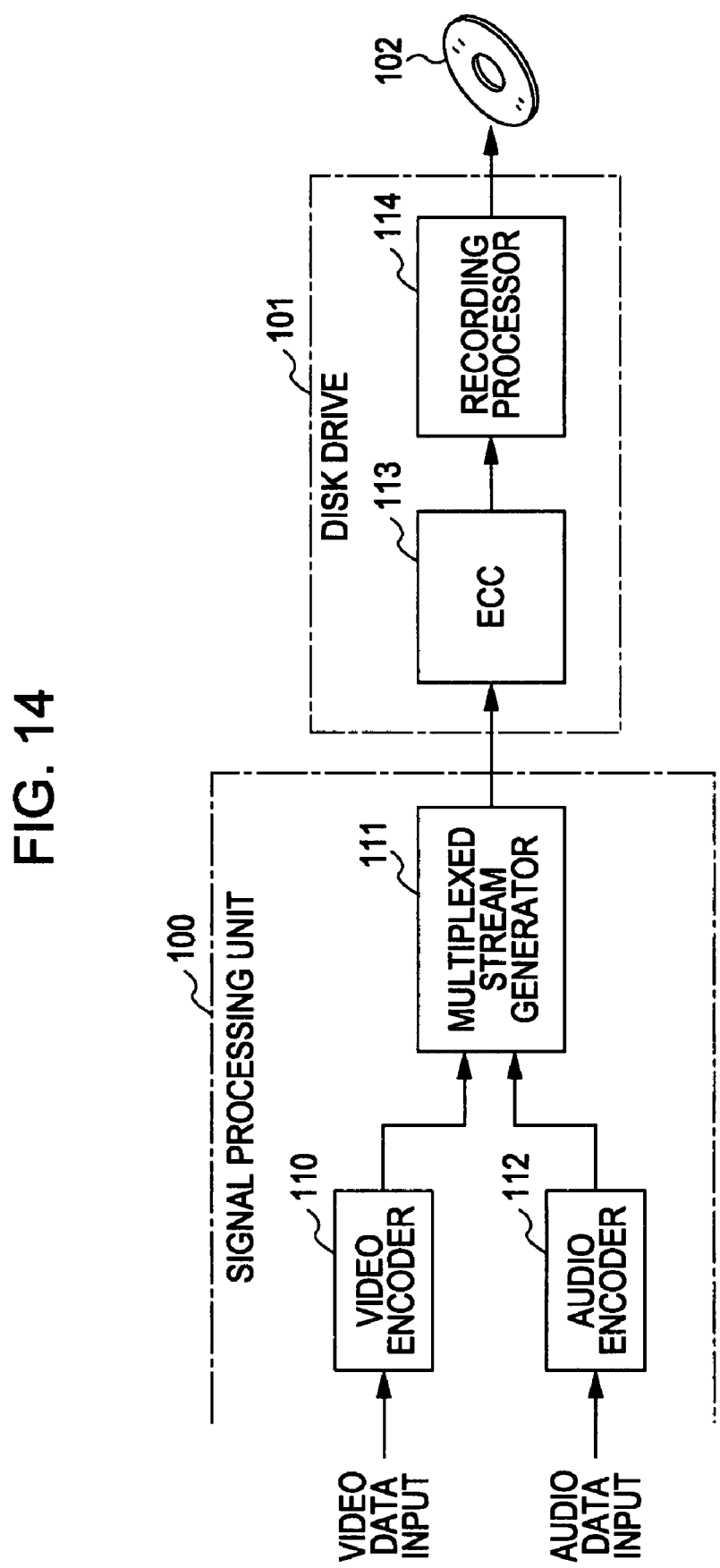
FIG. 14 is a block diagram schematically showing a process of recording video data and audio data on a recording medium in related art.
Figure 15:
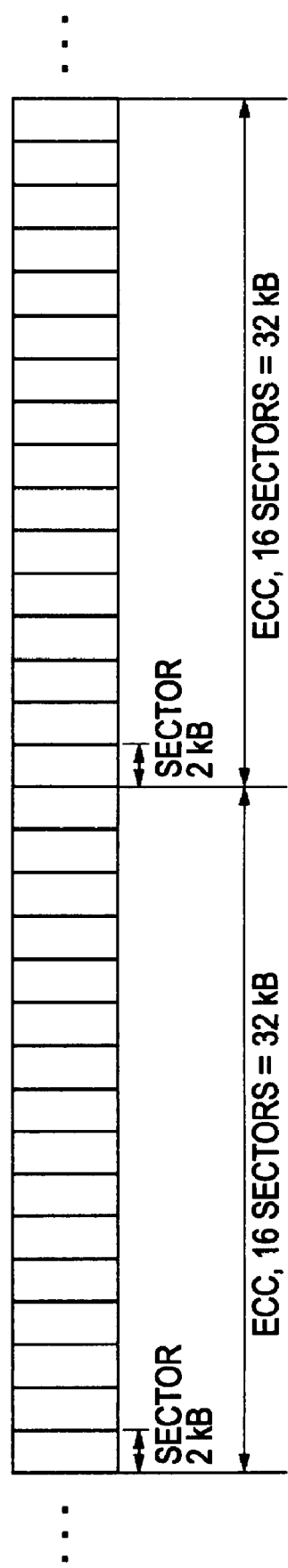
FIG. 15 shows an example of the relationship between sectors and ECC blocks on a DVD-R.
Figure 17A:
FIGS. 17A and 17B illustrate how to restart writing of data on the basis of restrictions of a recording side data unit.
Figure 17B:
Figure 18A:
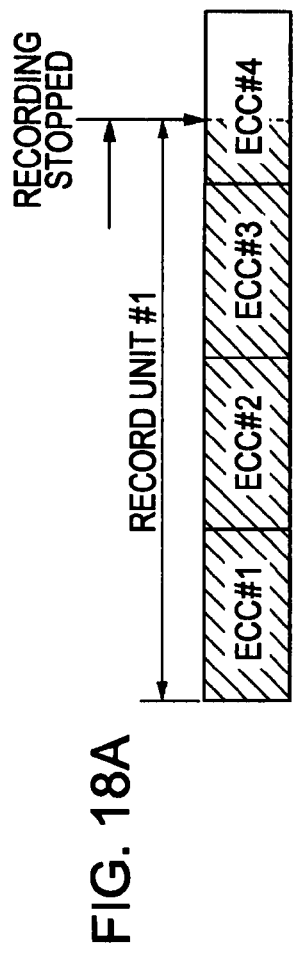
FIGS. 18A to 18C illustrate a method of recording data so that the restrictions of the recording side data unit and the restrictions of the signal-processing side data unit are met.
Figure 18B:
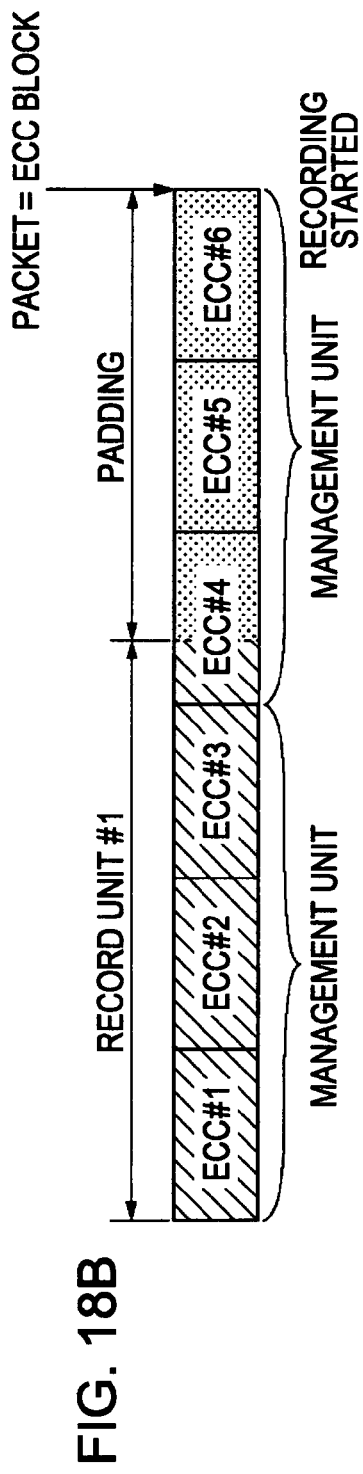
Figure 18C:
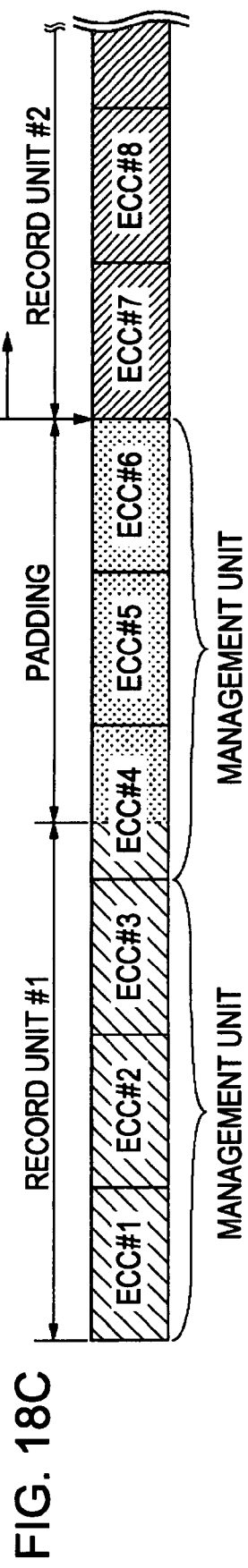

FIG. 13 is a flowchart showing an example of an alignment process according to the second modification of the embodiment of the present invention. According to the second modification of the embodiment of the present invention, when the control unit detects connection of another apparatus via the communication cable 61, the control unit performs the alignment process used when the disk is ejected, described above with reference to FIG. 8, and closes the file to allow the other apparatus to control the disk drive 11'.

Referring to FIG. 13, in Step S60, the process detects connection of another apparatus via the communication cable 61. The process performs the alignment on the basis of the island units in Steps S61 and S62. Step S61 and the subsequent steps are not performed during recording of data on the disk 12.

In Step S61, the process determines the size of the file created in the previous recording operation and embeds the padding data in the remaining section from the recording stop position in the final source packet of the file created in the previous recording operation to the trailing end of the final source packet on the basis of the determined file size. In Step S62, the process performs the alignment on the basis of the island units. Specifically, the null packets are recorded in the section from the source packet next to the source packet embedded with the padding data in Step S61 to the source packet where the file size becomes equal to a multiple of the data size of the island unit, as described above with reference to FIGS. 5A and 5B.

In the recording of the null packets in Step S62, the processing in units of the source packets is performed on the memory of the MUX 32, the processed data is written in the memory of the ECC encoder-decoder 42, and the data is recorded on the disk 12 in units of the ECC blocks, as in the examples shown in FIGS. 6 and 7.

When the file size becomes equal to a multiple of the data size of the island unit, the file is closed. In Step S63, the recording apparatus becomes capable of data communication with the other apparatus connected the recording apparatus via the communication I/F unit 60 and the communication cable 61.

Although the alignment on the basis of the island units is performed when the connection with the other apparatus is detected in Step S60, the second modification of the embodiment of the present invention is not limited to this. For example, the alignment on the basis of the island units may not be performed when the connection with the other apparatus via the communication cable 61 is detected, and the alignment on the basis of the island units in Steps S61 and S62 may be performed when the data communication between the recording apparatus and the other apparatus connected to the recording apparatus is started.

Although the signal processing units 10 in the recording apparatus according to the embodiment of the present invention (refer to FIG. 1), the video camera apparatus 200 according to the first modification of the embodiment of the present invention (refer to FIG. 10), and the recording apparatus according to the second modification of the embodiment of the present invention (refer to FIG. 11) are configured by hardware, the embodiment and the modifications thereof of the present invention are not limited to the above examples. The signal processing unit 10 may be configured by software. In this case, the software is stored in advance in an ROM (not shown) of the control unit 20.

Alternatively, the signal processing unit 10 may be configured in a computer apparatus, such as a personal computer. In this case, the software causing the computer apparatus to execute the signal processing unit 10 is recorded and delivered in a recording medium, such as a compact disc-read only memory (CD-ROM) or a digital versatile disk-read only memory (DVD-ROM). If the computer apparatus can be connected to a network, the software may be downloaded via the network, such as the Internet. A disk drive device included in the computer apparatus or externally connected thereto is applicable to the disk drive 11 and the disk drive 11'.

It should be understood by those skilled in the art that various modifications, combinations, sub-combinations and alterations may occur depending on design requirements and other factors insofar as they are within the scope of the appended claims or the equivalents thereof.

What is claimed is:

1. A recording apparatus capable of recording data including video data and audio data in one or more record units as one file, each record unit beginning when recording is started and ending when the recording is stopped, each record unit comprising at least one block, each block comprising at least one packet storing the data, the recording apparatus comprising:
a control unit that controls to record data embedded with a first section of padding data at stop of the recording, the first section being from trailing end of valid data to trailing end of a block that includes the trailing end of the valid data, and to record data embedded with a second section of padding data at restart of the recording after the stop of the recording, the second section being from the trailing end of the block that includes the trailing end of the valid data to trailing end of a packet that includes the trailing end of the block.

2. The recording apparatus according to claim 1, wherein each packet has a first size, each block has a second size, wherein the data are recorded on a recording medium that is removable from the recording apparatus and has a minimum record unit having a third size that is larger than the first size and is smaller than the second size, and
wherein the control unit controls to record the data embedded with the second section of padding data at the restart of the recording, and to record data embedded with a third section of padding data, the third section being from a packet next to the packet that includes the trailing end of the block to a packet where respective trailing end thereof reaches trailing end of the minimum record unit if the recording medium is ejected after the recording is stopped.

3. The recording apparatus according to claim 2, wherein the control unit controls to record the data embedded with the second section of padding data at the restart of the recording, and to record data embedded with the third section of padding data, if the stop of the recording is based on system requirements.

4. The recording apparatus according to claim 3, wherein the system requirements are based on an upper limit of a file size in which the control unit can manage the file.

5. The recording apparatus according to claim 3, wherein the system requirements are based on an upper limit of a continuous recording time of the video data.

6. The recording apparatus according to claim 1, wherein the control unit controls to record packets storing the video data and the audio data after the packet that includes the trailing end of the block which includes the trailing end of the valid data if a predetermined setting of the video data or the audio data is not changed at the restart of the recording after the recording is stopped.

7. The recording apparatus according to claim 1, wherein the block is an error correction coding block used in error correction coding.

8. The recording apparatus according to claim 2, wherein the control unit controls to record the data embedded with the second section of padding data, and to record the data embedded with the third section of padding data, and to create a new file and record packets storing the video data and the audio data generated during the recording in the new file if a predetermined setting of the video data or the audio data is changed at the restart of the recording after the recording is stopped.

9. The recording apparatus according to claim 2, further comprising:
a communication unit capable of data communication with another apparatus,
wherein the control unit controls to record the data embedded with the second section of padding data, and to record data embedded with the third section of padding data if the recording apparatus performs the data communication with the other apparatus via the communication unit after the recording is stopped.

10. A recording method capable of recording data including video data and audio data in one or more record units as one file on a recording medium, each record unit beginning when recording is started and ending when the recording is stopped, each record unit comprising at least one block, each block comprising at least one packet storing the data, the recording method comprising:
controlling to record data embedded with a first section of padding data at stop of the recording, the first section being from the trailing end of valid data to trailing end of a block that includes the trailing end of the valid data, and to record data embedded with a second section of padding data at restart of the recording after the stop of the recording, the second section being from the trailing end of the block to trailing end of a packet includes the trailing end of the block.

11. A non-transitory computer-readable medium including a program executable by a processor to perform a recording method capable of recording data including video data and audio data in one or more record units as one file, each record unit beginning when recording is started and ending when the recording is stopped, each record unit comprising at least one block, each block comprising at least one packet storing the data, the recording method comprising:
controlling to record data embedded with a first section of padding data at stop of the recording, the first section being from trailing end of valid data to trailing end of a block that includes the trailing end of the valid data, and to record data embedded with a second section of padding data at restart of the recording after the stop of the recording, the second section being from the trailing end of the block to trailing end of a packet that includes the trailing end of the block.

12. An image pickup apparatus capable of recording data including video data and audio data in one or more record units as one file, each record unit beginning when recording is started and ending when the recording is stopped, each record unit comprising at least one block, each block comprising at least one packet storing the data, the image pickup apparatus comprising:
a control unit that controls to record data embedded with a first section of padding data at stop of the recording, the first section being from trailing end of valid data to trailing end of a block that includes the trailing end of the valid data, and to record data embedded with a second section of padding data at restart of the recording after the stop of the recording, the second section being from the trailing end of the block to trailing end of a packet that includes the trailing end of the block.

13. The image pickup apparatus according to claim 12, wherein each packet has a first size, each block has a second size, wherein the data are recorded on a recording medium that is removable from the image pickup apparatus and has a minimum record unit having a third size that is larger than the first size and is smaller than the second size, and
wherein the control unit controls to record the data embedded with the second section of padding data at the restart of the recording, and to record data embedded with a third section of padding data, the third section being from a packet next to the packet that includes the trailing end of the block to a packet where respective trailing end thereof reaches trailing end of the minimum record unit if the recording medium is ejected after the recording is stopped.

14. The image pickup apparatus according to claim 13, wherein the control unit controls to record the data embedded with the second section of padding data at the restart of the recording, and to record data embedded with the third section of padding data, if the stop of the recording is based on system requirements.

15. The image pickup apparatus according to claim 14, wherein the system requirements are based on an upper limit of a file size in which the control unit can manage the file.

16. The image pickup apparatus according to claim 14, wherein the system requirements are based on an upper limit of a continuous recording time of the video data.

17. The image pickup apparatus according to claim 12, wherein the control unit controls to record packets storing the video data and the audio data after the packet that includes the trailing end of the block which includes the trailing end of the valid data if a predetermined setting of the video data or the audio data is not changed at the restart of the recording after the recording is stopped.

18. The image pickup apparatus according to claim 12, wherein the block is an error correction coding block used in error correction coding.

19. The image pickup apparatus according to claim 13, wherein the control unit controls to record the data embedded with the second section of padding data, and to record the data embedded with the third section of padding data, and to create a new file and record the packets storing the video data and the audio data generated during the recording in the new file if a predetermined setting of the video data or the audio data is changed at the restart of the recording after the recording is stopped.

20. The image pickup apparatus according to claim 13, further comprising:
a communication unit capable of data communication with another apparatus,
wherein the control unit controls to record the data embedded with the second section of padding data, and to record data embedded with the third section of padding data if the image pickup apparatus performs the data communication with the other apparatus via the communication unit after the recording is stopped.

21. An image pickup method for recording data including video data and audio data in one or more record units as one file, each record unit beginning when recording is started and ending when the recording is stopped, each record unit comprising at least one block, each block comprising at least one packet storing the data, the image pickup method comprising:

controlling to record data embedded with a first section of padding data at stop of the recording, the first section being from trailing end of valid data to trailing end of a block that includes the trailing end of the valid data, and to record data embedded with a second section of padding data at restart of the recording after the stop of the recording, the second section being from the trailing end of the block to trailing end of a packet that includes the trailing end of the block.

22. A non-transitory computer-readable medium including a program executable by a processor to perform an image pickup method for an image pickup apparatus capable of recording data including video data and audio data in one or more record units as one file, each record unit beginning when recording is started and ending when the recording is stopped, each record unit comprising at least one block, each block comprising at least one packet storing the data, the image pickup method comprising:

controlling to record data embedded with a first section of padding data at stop of the recording, the first section being from trailing end of valid data to trailing end of a block that includes the trailing end of the valid data, and to record data embedded in a second section of padding data at restart of the recording after the stop of the recording, the second section being from the trailing end of the block to trailing end of a packet that includes the trailing end of the block.

* * * * *